(12) United States Patent
Tanaka et al.

(10) Patent No.: US 11,319,635 B2
(45) Date of Patent: May 3, 2022

(54) ELECTROLYSIS VESSEL FOR ALKALINE WATER ELECTROLYSIS

(71) Applicant: TOKUYAMA CORPORATION, Shunan (JP)

(72) Inventors: Yasuyuki Tanaka, Shunan (JP); Ryouta Umebayashi, Shunan (JP)

(73) Assignee: TOKUYAMA CORPORATION, Shunan (JP)

( * ) Notice: Subject to any disclaimer, the term of this patent is extended or adjusted under 35 U.S.C. 154(b) by 68 days.

(21) Appl. No.: 16/981,963

(22) PCT Filed: Mar. 12, 2019

(86) PCT No.: PCT/JP2019/010091
§ 371 (c)(1),
(2) Date: Sep. 17, 2020

(87) PCT Pub. No.: WO2019/188260
PCT Pub. Date: Oct. 3, 2019

(65) Prior Publication Data
US 2021/0115573 A1    Apr. 22, 2021

(30) Foreign Application Priority Data
Mar. 27, 2018   (JP) .............................. JP2018-060640

(51) Int. Cl.
*C25B 9/77*    (2021.01)
*C25B 9/63*    (2021.01)
(Continued)

(52) U.S. Cl.
CPC .................. *C25B 9/77* (2021.01); *C25B 1/04* (2013.01); *C25B 9/19* (2021.01); *C25B 9/63* (2021.01); *C25B 9/75* (2021.01)

(58) Field of Classification Search
CPC .................................................. C25B 9/73–77
See application file for complete search history.

(56) References Cited

U.S. PATENT DOCUMENTS 3,654,120 A * 4/1972 Messner ................... C25B 9/77
204/255
3,857,773 A * 12/1974 Du Bois .................... C25B 9/00
204/242

(Continued)

FOREIGN PATENT DOCUMENTS

CA      2143100 C  *  2/2001  ............. C25B 15/06
GB       211946 A       2/1924

(Continued)

*Primary Examiner* — Harry D Wilkins, III
(74) *Attorney, Agent, or Firm* — Birch, Stewart, Kolasch & Birch, LLP

(57) ABSTRACT

The electrolysis vessel for alkaline water electrolysis includes an anode end unit, a cathode end unit, anode chamber cells, cathode chamber cells, and separating membranes. The anode/cathode end units each comprise a pressing frame, an insulating plate, and an end cell. The anode/cathode chamber cells are alternately arranged between the anode end unit and the cathode end unit. Electrolyte supply/recovery flow paths are arranged through each chamber cell. Electrolyte supply/recovery pipes each being a metal pipe, at least an inner surface of the metal pipe being coated with an insulating resin, are connected to the electrolyte supply/recovery flow paths respectively via through-holes arranged through the pressing frame(s) and the insulating plate(s). At the junction of the electrolyte supply/recovery pipes and the electrolyte supply/recovery flow paths, electrolytes do not contact with any metal member of the electrolyte supply/recovery pipes or the pressing frames, or any metal member electrically connected therewith.

6 Claims, 12 Drawing Sheets

(51) Int. Cl.
  *C25B 1/04* (2021.01)
  *C25B 9/75* (2021.01)
  *C25B 9/19* (2021.01)

(56) References Cited

U.S. PATENT DOCUMENTS

| | | | | |
|---|---|---|---|---|
| 3,864,236 | A | * | 2/1975 | Lindstrom ................ C25B 9/70 |
| | | | | 204/265 |
| 4,371,433 | A | * | 2/1983 | Balko ....................... C25B 9/77 |
| | | | | 204/230.2 |
| 4,692,229 | A | * | 9/1987 | Bjareklint ................ C25B 9/70 |
| | | | | 205/754 |
| 4,738,763 | A | * | 4/1988 | Abrahamson ............ C25B 9/73 |
| | | | | 204/255 |
| 7,014,740 | B2 | | 3/2006 | Kim |
| 2006/0042935 | A1 | | 3/2006 | Houda et al. |
| 2014/0305794 | A1 | | 10/2014 | Wallevik et al. |
| 2015/0203976 | A1 | | 7/2015 | Noaki et al. |
| 2016/0153100 | A1 | | 6/2016 | Nakagawa et al. |
| 2018/0245224 | A1 | | 8/2018 | Takahashi et al. |

FOREIGN PATENT DOCUMENTS

| | | | | |
|---|---|---|---|---|
| GB | 1523045 | * | 8/1978 | ............... C25B 1/46 |
| JP | 51-1142497 A | * | 12/1976 | ............... C25B 1/46 |
| JP | 2002-332586 A | | 11/2002 | |
| JP | 4453973 B2 | | 4/2010 | |
| JP | 2015-117417 A | | 6/2015 | |
| JP | 6093351 B2 | | 3/2017 | |
| WO | WO 2013/191140 A1 | | 12/2013 | |
| WO | WO 2014/178317 A1 | | 11/2014 | |
| WO | WO 2017/188422 A1 | | 11/2017 | |

* cited by examiner

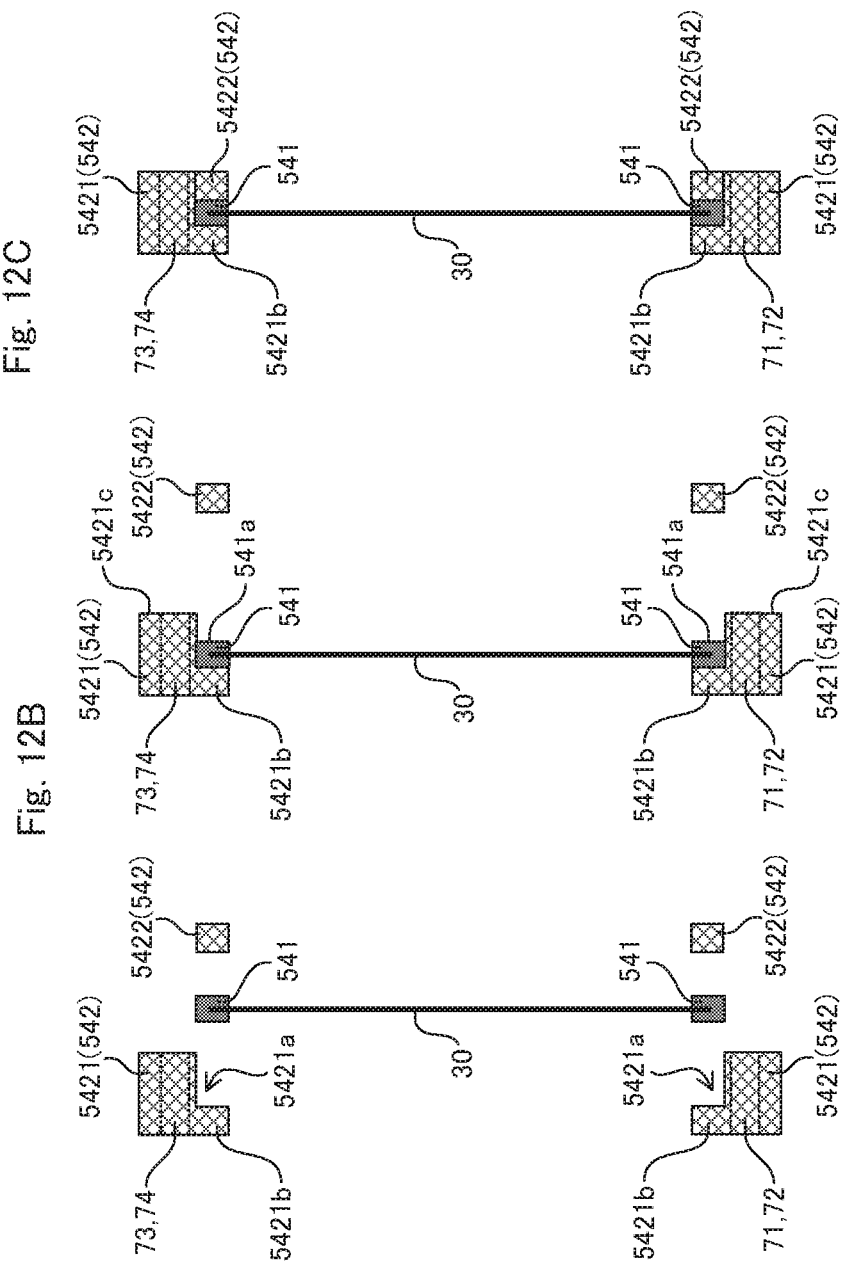

ELECTROLYSIS VESSEL FOR ALKALINE WATER ELECTROLYSIS

TECHNICAL FIELD

The present invention relates to an electrolysis vessel for alkaline water electrolysis, and more specifically to an electrolysis vessel that can be preferably used for alkaline water electrolysis using an unstable power supply such as renewable energy.

BACKGROUND ART

The alkaline water electrolysis method is known as a method of producing hydrogen gas and oxygen gas. In the alkaline water electrolysis method, water is electrolyzed using a basic aqueous solution (alkaline water) including an alkali metal hydroxide (such as NaOH and KOH) dissolved therein as an electrolytic solution, to generate hydrogen gas at a cathode and oxygen gas at an anode. An electrolysis vessel including a plurality of electrolytic cells stacked in series is known as an electrolysis vessel for alkaline water electrolysis: each of the electrolytic cells is partitioned by an ion-permeable separating membrane into an anode chamber where an anode is arranged, and a cathode chamber where a cathode is arranged.

CITATION LIST

Patent Literature

Patent Literature 1: WO 2013/191140 A1
Patent Literature 2: JP 2002-332586 A
Patent Literature 3: JP 4453973 B2
Patent Literature 4: WO 2014/178317 A1
Patent Literature 5: JP 6093351 B2
Patent Literature 6: JP 2015-117417 A

SUMMARY OF INVENTION

Technical Problem

FIG. 1 is a schematically explanatory cross-sectional view of a conventional electrolysis vessel for alkaline water electrolysis 900 according to one embodiment, and FIG. 2 shows FIG. 1 taken along the arrows A-A. The upward and the downward in the vertical direction on each sheet of FIGS. 1 and 2 respectively correspond to the upward and the downward in a perpendicular direction. The electrolysis vessel 900 includes an anode end unit 901e, a cathode end unit 902e, a plurality of anode chamber cell 910 each comprising an anode 914 arranged therein and an electroconductive separating back wall 911, a plurality of cathode chamber cell 920 each comprising a cathode 924 arranged therein and an electroconductive separating back wall 921, and a plurality of ion-permeable separating membrane 930 each comprising a periphery sandwiched between and held by a gasket 940: the plurality of the anode chamber cell and the plurality of the cathode chamber cell are alternately arranged between the anode end unit and the cathode end unit. Each adjacent pair of the separating membranes 930, 930 sandwich therebetween a pair of the anode chamber cell 910 and the cathode chamber cell 920: the anode chamber cell and the cathode chamber cell are arranged such that the separating back wall 911 and the separating back wall 921 adjoin each other.

The anode end unit 901e comprises, in the sequence set forth from an anode-end-side of the electrolysis vessel (the right on the sheet of FIG. 1) an anode-side pressing frame 961, an anode-side insulating plate 951, and an anode end cell 910e. The cathode end unit 902e comprises, in the sequence set forth from a cathode-end-side of the electrolysis vessel (the left on the sheet of FIG. 1) a cathode-side pressing frame 962, a cathode-side insulating plate 952, and a cathode end cell 920e.

An anolyte supply flow path 971 is arranged through a lower part of the anode end cell 910e, each lower part of the anode chamber cells 910, each lower part of the cathode chamber cells 920, a lower part of the cathode end cell 920e, and each lower part of the gaskets 940; and an anolyte-and-gas recovery flow path 973 is arranged through an upper part of the anode end cell 910e, each upper part of the anode chamber cells 910, each upper part of the cathode chamber cells 920, an upper part of the cathode end cell 920e, and each upper part of the gaskets 940. An anolyte is supplied from the anolyte supply flow path 971 into each anode chamber A; and the anolyte and a gas generated at the anodes 914 are recovered from each anode chamber A into the anolyte-and-gas recovery flow path 973.

A catholyte supply flow path 972 is arranged through a lower part of the cathode end cell 920e, each lower part of the anode chamber cells 910, each lower part of the cathode chamber cells 920, and each lower part of the gaskets 940; and a catholyte-and-gas recovery flow path 974 is arranged through an upper part of the cathode end cell 920e, each upper part of the anode chamber cells 910, each upper part of the cathode chamber cells 920, and each upper part of the gaskets 940. A catholyte is supplied from the catholyte supply flow path 972 into each cathode chamber C, and the catholyte and a gas generated at the cathodes 924 are recovered from each cathode chamber C into the catholyte-and-gas recovery flow path 974.

A first through-hole (not shown) is arranged through the cathode-side pressing frame 962 and the cathode-side insulating plate 952, and an anolyte supply pipe 981 is connected with the anolyte supply flow path 971 via the first through-hole and supplying the anolyte to the anolyte supply flow path.

A second through-hole (not shown) is arranged through the cathode-side pressing frame 962 and the cathode-side insulating plate 952, and a catholyte supply pipe 982 is connected with the catholyte supply flow path 972 via the second through-hole and supplying the catholyte to the catholyte supply flow path.

A third through-hole (not shown) is arranged through the cathode-side pressing frame 962 and the cathode-side insulating plate 952, and an anolyte-and-gas recovery pipe 983 is connected with the anolyte-and-gas recovery flow path 973 via the third through-hole and recovering the anolyte and the gas from the anolyte-and-gas recovery flow path.

A fourth through-hole (not shown) is arranged through the cathode-side pressing frame 962 and the cathode-side insulating plate 952, and a catholyte-and-gas recovery pipe 984 is connected with the catholyte-and-gas recovery flow path 974 via the fourth through-hole and recovering the catholyte and the gas from the catholyte-and-gas recovery flow path.

The anode end cell 910e, the anode chamber cells 910, the cathode chamber cells 920, and the cathode end cell 920e are each made from a metal. The anolyte supply pipe 981, the catholyte supply pipe 982, the anolyte-and-gas recovery pipe 983, and the catholyte-and-gas recovery pipe 984 are each made from a metal as well. An anode terminal is connected to the anode end cell 910e, and a cathode terminal is connected to the cathode end cell 920*e*. All of the anode-side pressing frame 961, the cathode-side pressing frame 962, the anolyte supply pipe 981, the catholyte supply pipe 982, the anolyte-and-gas recovery pipe 983, and the catholyte-and-gas recovery pipe 984 are electrically grounded for safety.

Disadvantageously, the grounded anolyte supply pipe 981 and anolyte-and-gas recovery pipe 983, and the pressing frame 962 function as a counter electrode for the anodes 914, which are working electrodes, to cause the reverse reaction of the anode reaction inside the anolyte supply pipe 981 and the anolyte-and-gas recovery pipe 983, since the anolyte is continuous through the anolyte supply pipe 981, the anolyte supply flow path 971, each anode chamber A, the anolyte-and-gas recovery flow path 973, and the anolyte-and-gas recovery pipe 983. Likewise, the grounded catholyte supply pipe 982 and catholyte-and-gas recovery pipe 984, and the pressing frame 962 function as a counter electrode for the cathodes 924, which are working electrodes, to cause the reverse reaction of the cathode reaction inside the catholyte supply pipe 982 and the catholyte-and-gas recovery pipe 984, since the catholyte is continuous through the catholyte supply pipe 982, the catholyte supply flow path 972, each cathode chamber C, the catholyte-and-gas recovery flow path 974, and the catholyte-and-gas recovery pipe 984. An electric current which flows accompanying such a reverse reaction is referred to as a leakage current.

In the electrolysis vessel for alkaline water electrolysis 900, oxygen gas is generated by the main reaction (anode reaction) in each anode chamber A. Oxygen gas generated in each anode chamber A is recovered from the anolyte-and-gas recovery pipe 983 via the anolyte-and-gas recovery flow path 973. In the reverse reaction of the anode reaction however, hydrogen gas is generated: if a leakage current flows, hydrogen gas contaminates oxygen gas recovered from the anolyte-and-gas recovery pipe 983, to lower the purity of the recovered oxygen gas. In the electrolysis vessel for alkaline water electrolysis 900, hydrogen gas is generated by the main reaction (cathode reaction) in each cathode chamber C. Hydrogen gas generated in each cathode chamber C is recovered from the catholyte-and-gas recovery pipe 984 via the catholyte-and-gas recovery flow path 974. In the reverse reaction of the cathode reaction however, oxygen gas is generated: if a leakage current flows, oxygen gas contaminates hydrogen gas recovered from the catholyte-and-gas recovery pipe 984, to lower the purity of the recovered hydrogen gas.

In recent years, it has been proposed to utilize hydrogen produced by using electric power generated utilizing renewable energy such as solar power and wind power, as a storable and portable energy source. However, an electricity output from renewable energy is generally unstable. Particularly, electric power generated by solar power considerably varies according to time and weather in a day. For example, an electricity output is extremely low in the morning and in the evening, and when it is cloudy and when it is rainy. Use of such an unstable power supply as a power supply for alkaline water electrolysis unless such an unstable power supply is stabilized using a secondary battery or the like causes a current value of the main reaction to considerably vary according to electric power supplied from the power supply. In contrast, it is known that a leakage current value does not vary so much even when a current value of a main reaction varies. Thus, when electric power supplied from the power supply is low, the amount of an electric current of a main reaction is also small, which results in small amounts of hydrogen gas and oxygen gas generated in the main reaction. In contrast, since a leakage current value does not lower proportionally to a current value of the main reaction, the amount of gas generated in the reverse reaction does not largely decrease. As a result, the concentration of oxygen gas in the obtained hydrogen gas, and the concentration of hydrogen gas in the obtained oxygen gas increase, to lower the quality of the obtained gases. The composition of the obtained gases may be within the combustibility range, depending on some conditions.

An object of the present invention is to provide an electrolysis vessel for alkaline water electrolysis which can suppress influence of leakage current even when an unstable power supply is used. The present invention also provides a method of producing gas using this electrolysis vessel for alkaline water electrolysis.

Solution to Problem

The present invention encompasses the following embodiments [1] to [6].

[1] An electrolysis vessel for alkaline water electrolysis, the electrolysis vessel comprising:

an anode end unit;

a cathode end unit;

a plurality of anode chamber cell each comprising an anode arranged therein and a first electroconductive separating back wall, the anode generating oxygen;

a plurality of cathode chamber cell each comprising a cathode arranged therein and a second electroconductive separating back wall, the cathode generating hydrogen; and a plurality of ion-permeable separating membrane each comprising a periphery, the periphery being held by a protecting member;

the plurality of the anode chamber cell and the plurality of the cathode chamber cell being alternately arranged between the anode end unit and the cathode end unit;

each adjacent pair of the plurality of separating membrane sandwiching a pair of the anode chamber cell and the cathode chamber cell, the anode chamber cell being arranged in a direction such that the first separating back wall is directed toward the anode end unit, the cathode chamber cell being arranged in a direction such that the second separating back wall is directed toward the cathode end unit, the cathode chamber cell and the anode chamber cell being arranged such that the first separating back wall and the second separating back wall adjoin each other, wherein the first separating back wall and the second separating back wall may be formed as one body;

the anode end unit comprising, in the sequence set forth from an anode-end-side of the electrolysis vessel:

an anode-side pressing frame;

an anode-side insulating plate; and an anode end cell;

the cathode end unit comprising, in the sequence set forth from a cathode-end-side of the electrolysis vessel:

a cathode-side pressing frame;

a cathode-side insulating plate; and a cathode end cell;

the protecting members comprising a first protecting member adjacent to the anode end cell, and a second protecting member adjacent to the cathode end cell;

the electrolysis vessel further comprising:

an anolyte supply flow path arranged through a lower part of the anode end cell, each lower part of the anode chamber cells, each lower part of the cathode chamber cells, and each lower part of the protecting members other than the second protecting member, wherein an anolyte is supplied from the anolyte supply flow path into each anode chamber;

an anolyte-and-gas recovery flow path arranged through an upper part of the anode end cell, each upper part of the anode chamber cells, each upper part of the cathode chamber cells, and each upper part of the protecting members other than the second protecting member, wherein the anolyte and a gas generated at the anode are recovered from each anode chamber into the anolyte-and-gas recovery flow path;

a catholyte supply flow path arranged through a lower part of the cathode end cell, each lower part of the anode chamber cells, each lower part of the cathode chamber cells, and each lower part of the protecting members other than the first protecting member, wherein a catholyte is supplied from the catholyte supply flow path into each cathode chamber;

a catholyte-and-gas recovery flow path arranged through an upper part of the cathode end cell, each upper part of the anode chamber cells, each upper part of the cathode chamber cells, and each upper part of the protecting members other than the first protecting member, wherein the catholyte and a gas generated at the cathode are recovered from each cathode chamber into the catholyte-and-gas recovery flow path;

a first through-hole being arranged through the anode-side pressing frame and the anode-side insulating plate such that the first through-hole communicates with the anolyte supply flow path, or being arranged through the cathode-side pressing frame and the cathode-side insulating plate such that the first through-hole communicates with the anolyte supply flow path;

an anolyte supply pipe being connected with the anolyte supply flow path via the first through-hole and supplying the anolyte to the anolyte supply flow path;

a second through-hole being arranged through the anode-side pressing frame and the anode-side insulating plate such that the second through-hole communicates with the catholyte supply flow path, or being arranged through the cathode-side pressing frame and the cathode-side insulating plate such that the second through-hole communicates with the catholyte supply flow path;

a catholyte supply pipe being connected with the catholyte supply flow path via the second through-hole and supplying the catholyte to the catholyte supply flow path;

a third through-hole being arranged through the anode-side pressing frame and the anode-side insulating plate such that the third through-hole communicates with the anolyte-and-gas recovery flow path, or being arranged through the cathode-side pressing frame and the cathode-side insulating plate such that the third through-hole communicates with the anolyte-and-gas recovery flow path;

an anolyte-and-gas recovery pipe being connected with the anolyte-and-gas recovery flow path via the third through-hole and recovering the anolyte and the gas from the anolyte-and-gas recovery flow path;

a fourth through-hole being arranged through the anode-side pressing frame and the anode-side insulating plate such that the fourth through-hole communicates with the catholyte-and-gas recovery flow path, or being arranged through the cathode-side pressing frame and the cathode-side insulating plate such that the fourth through-hole communicates with the catholyte-and-gas recovery flow path;

a catholyte-and-gas recovery pipe being connected with the catholyte-and-gas recovery flow path via the fourth through-hole and recovering the catholyte and the gas from the catholyte-and-gas recovery flow path; and the anolyte supply pipe, the catholyte supply pipe, the anolyte-and-gas recovery pipe, and the catholyte-and-gas recovery pipe each being a metal pipe comprising an inner surface, at least the inner surface of the metal pipe being coated with an insulating resin, wherein if the anolyte supply pipe is connected with the anolyte supply flow path via the first through-hole arranged through the cathode-side pressing frame and the cathode-side insulating plate, the anolyte supply flow path is also arranged through the lower part of the cathode end cell and a lower part of the second protecting member as well;

if the catholyte supply pipe is connected with the catholyte supply flow path via the second through-hole arranged through the anode-side pressing frame and the anode-side insulating plate, the catholyte supply flow path is also arranged through the lower part of the anode end cell and a lower part of the first protecting member as well;

if the anolyte-and-gas recovery pipe is connected with the anolyte-and-gas recovery flow path via the third through-hole arranged through the cathode-side pressing frame and the cathode-side insulating plate, the anolyte-and-gas recovery flow path is also arranged through the upper part of the cathode end cell and an upper part of the second protecting member as well;

if the catholyte-and-gas recovery pipe is connected with the catholyte-and-gas recovery flow path via the fourth through-hole arranged through the anode-side pressing frame and the anode-side insulating plate, the catholyte-and-gas recovery flow path is also arranged through the upper part of the anode end cell and an upper part of the first protecting member as well;

at a junction of the anolyte supply pipe and the anolyte supply flow path and at a junction of the anolyte-and-gas recovery pipe and the anolyte-and-gas recovery flow path, the anolyte does not contact with any metal member of the anolyte supply pipe, any metal member of the anolyte-and-gas recovery pipe, any metal member of the anode-side pressing frame, any metal member of the cathode-side pressing frame, or any metal member electrically connected therewith;

at a junction of the catholyte supply pipe and the catholyte supply flow path and at a junction of the catholyte-and-gas recovery pipe and the catholyte-and-gas recovery flow path, the catholyte does not contact with any metal member of the catholyte supply pipe, any metal member of the catholyte-and-gas recovery pipe, any metal member of the anode-side pressing frame, any metal member of the cathode-side pressing frame, or any metal member electrically connected therewith; and an amount of hydrogen gas generated per unit time by a main reaction when the electrolysis vessel is operated with a minimum electric current is less than 10% of an amount of hydrogen gas generated per unit time by the main reaction when the electrolysis vessel is operated with a maximum electric current.

[2] The electrolysis vessel according to [1], wherein respective parts of the anolyte supply flow path communicate with each other;

respective parts of the anolyte-and-gas recovery flow path communicate with each other;

respective parts of the catholyte supply flow path communicate with each other; and respective parts of the catholyte-and-gas recovery flow path communicate with each other.

[3] The electrolysis vessel according to [1] or [2], wherein the catholyte supply flow path is arranged through the lower part of the anode end cell, each lower part of the anode chamber cells, each lower part of the cathode chamber cells, each lower part of the protecting members, and the lower part of the cathode end cell;

the catholyte-and-gas recovery flow path is arranged through the upper part of the anode end cell, each upper part of the anode chamber cells, each upper part of the cathode chamber cells, each upper part of the protecting members, and the upper part of the cathode end cell;

the anolyte supply pipe is connected with the anolyte supply flow path via the first through-hole, wherein the first through-hole is arranged through the anode-side pressing frame and the anode-side insulating plate such that the first through-hole communicates with the anolyte supply flow path;

the catholyte supply pipe is connected with the catholyte supply flow path via the second through-hole, wherein the second through-hole is arranged through the anode-side pressing frame and the anode-side insulating plate such that the second through-hole communicates with the catholyte supply flow path;

the anolyte-and-gas recovery pipe is connected with the anolyte-and-gas recovery flow path via the third through-hole, wherein the third through-hole is arranged through the anode-side pressing frame and the anode-side insulating plate such that the third through-hole communicates with the anolyte-and-gas recovery flow path; and the catholyte-and-gas recovery pipe is connected with the catholyte-and-gas recovery flow path via the fourth through-hole, wherein the fourth through-hole is arranged through the anode-side pressing frame and the anode-side insulating plate such that the fourth through-hole communicates with the catholyte-and-gas recovery flow path.

[4] The electrolysis vessel according to [1] or [2], wherein the anolyte supply flow path is arranged through the lower part of the anode end cell, each lower part of the anode chamber cells, each lower part of the cathode chamber cells, each lower part of the protecting members, and the lower part of the cathode end cell;

the anolyte-and-gas recovery flow path is arranged through the upper part of the anode end cell, each upper part of the anode chamber cells, each lower part of the cathode chamber cells, each upper part of the protecting members, and the upper part of the cathode end cell;

the anolyte supply pipe is connected with the anolyte supply flow path via the first through-hole, wherein the first through-hole is arranged through the cathode-side pressing frame and the cathode-side insulating plate such that the first through-hole communicates with the anolyte supply flow path;

the catholyte supply pipe is connected with the catholyte supply flow path via the second through-hole, wherein the second through-hole is arranged through the cathode-side pressing frame and the cathode-side insulating plate such that the second through-hole communicates with the catholyte supply flow path;

the anolyte-and-gas recovery pipe is connected with the anolyte-and-gas recovery flow path via the third through-hole, wherein the third through-hole is arranged through the cathode-side pressing frame and the cathode-side insulating plate such that the third through-hole communicates with the anolyte-and-gas recovery flow path; and the catholyte-and-gas recovery pipe is connected with the catholyte-and-gas recovery flow path via the fourth through-hole, wherein the fourth through-hole is arranged through the cathode-side pressing frame and the cathode-side insulating plate such that the fourth through-hole communicates with the catholyte-and-gas recovery flow path.

[5] A method of producing at least hydrogen gas by electrolyzing alkaline water, the method comprising:

(a) applying a fluctuating direct electric current to the electrolysis vessel as defined in any one of [1] to [4], to recover hydrogen gas from the catholyte-and-gas recovery pipe, wherein in the (a), an amount of hydrogen gas generated per unit time by a main reaction when the electrolysis vessel is operated with a minimum electric current of the fluctuating direct electric current is less than 10% of an amount of hydrogen gas generated per unit time by the main reaction when the electrolysis vessel is operated with a maximum electric current of the fluctuating direct electric current.

[6] The method according to [5], the (a) further comprising:

recovering oxygen gas from the anolyte-and-gas recovery pipe.

Advantageous Effects of Invention

In the electrolysis vessel for alkaline water electrolysis of the present invention, the anolyte supply pipe, the catholyte supply pipe, the anolyte-and-gas recovery pipe, and the catholyte-and-gas recovery pipe each are a metal pipe comprising an inner surface coated with an insulating resin; at the junction of the anolyte supply pipe and the anolyte supply flow path and at the junction of the anolyte-and-gas recovery pipe and the anolyte-and-gas recovery flow path, the anolyte does not contact with any metal member of the anode-side pressing frame or the cathode-side pressing frame, or any metal member electrically connected therewith; and at the junction of the catholyte supply pipe and the catholyte supply flow path and at the junction of the catholyte-and-gas recovery pipe and the catholyte-and-gas recovery flow path, the catholyte does not contact with any metal member of the anode-side pressing frame or the cathode-side pressing frame, or any metal member electrically connected therewith. Thus, the electrolysis vessel for alkaline water electrolysis of the present invention can increase the resistance against ionic conductivity (solution resistance) in flow paths from working electrodes to counter electrodes in a reverse reaction accompanied by a leakage current, and thus can suppress influence of a leakage current even when an unstable power supply is used.

The method of producing gas of the present invention using the electrolysis vessel for alkaline water electrolysis of the present invention can suppress influence of a leakage current even when an unstable power supply is used, which makes it possible to produce gas of improved purity while an unstable power supply is used.

BRIEF DESCRIPTION OF DRAWINGS

FIGS. 12A to 12C are explanatory cross-sectional views of a protecting member 540 in the electrolysis vessel 500 in further detail. FIG. 12A is a cross-sectional view showing a position where the protecting member 540 is exploded. FIG. 12B is a cross-sectional view showing a position where a gasket 541 is received in a receiving part 5421a of a base body frame 5421 and is supported by a supporting part 5421b in a stacking direction. FIG. 12C is a cross-sectional view showing a position where a lid frame 5422 is received in a difference in levels between a face 5421c of the base body frame 5421 and a face 5421a of the gasket in FIG. 12B.

DESCRIPTION OF EMBODIMENTS

Figure 1:
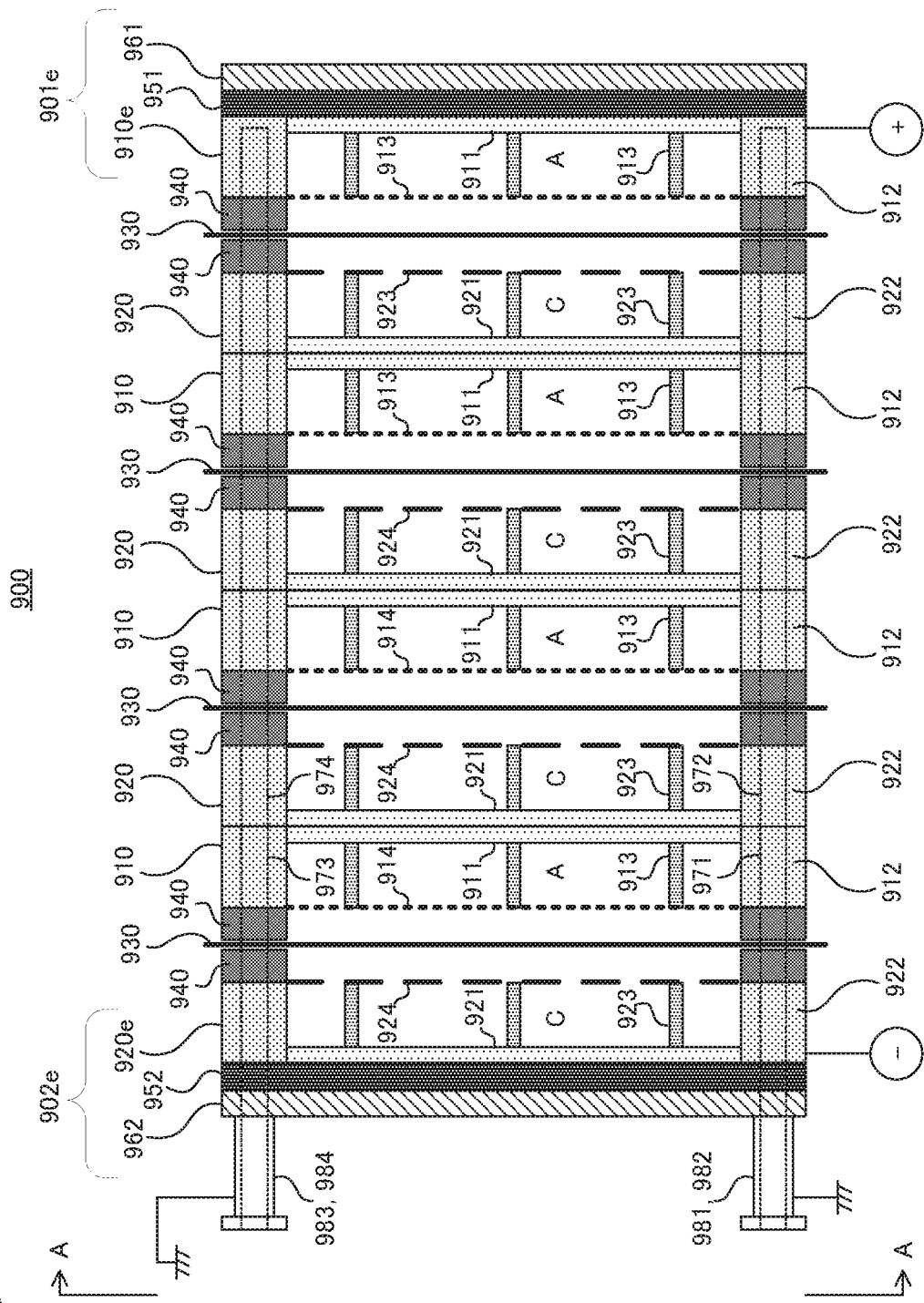
FIG. 1 is a schematically explanatory cross-sectional view of the conventional electrolysis vessel for alkaline water electrolysis 900.
Figure 2:
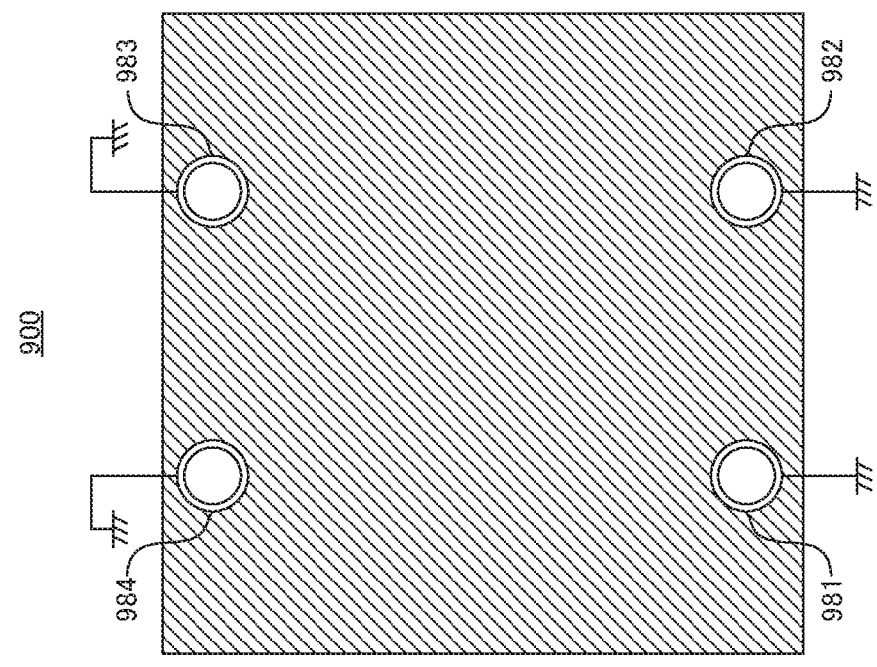
FIG. 2 shows FIG. 1 taken along the arrows A-A.

The above described effects and advantages of the present invention will be made clear by the following description of the embodiments. Hereinafter the embodiments of the present invention will be described with reference to the drawings. The present invention is not limited to these embodiments. The measures in the drawings do not always represent exact measures. Some reference signs may be omitted in the drawings. In the present description, expression "A to B" concerning numeral values A and B means "no less than A and no more than B" unless otherwise specified. In such expression, if a unit is added only to the numeral value B, this unit is applied to the numeral value A as well. A word "or" means a logical sum unless otherwise specified.

<1. Electrolysis Vessel>

Figure 3:
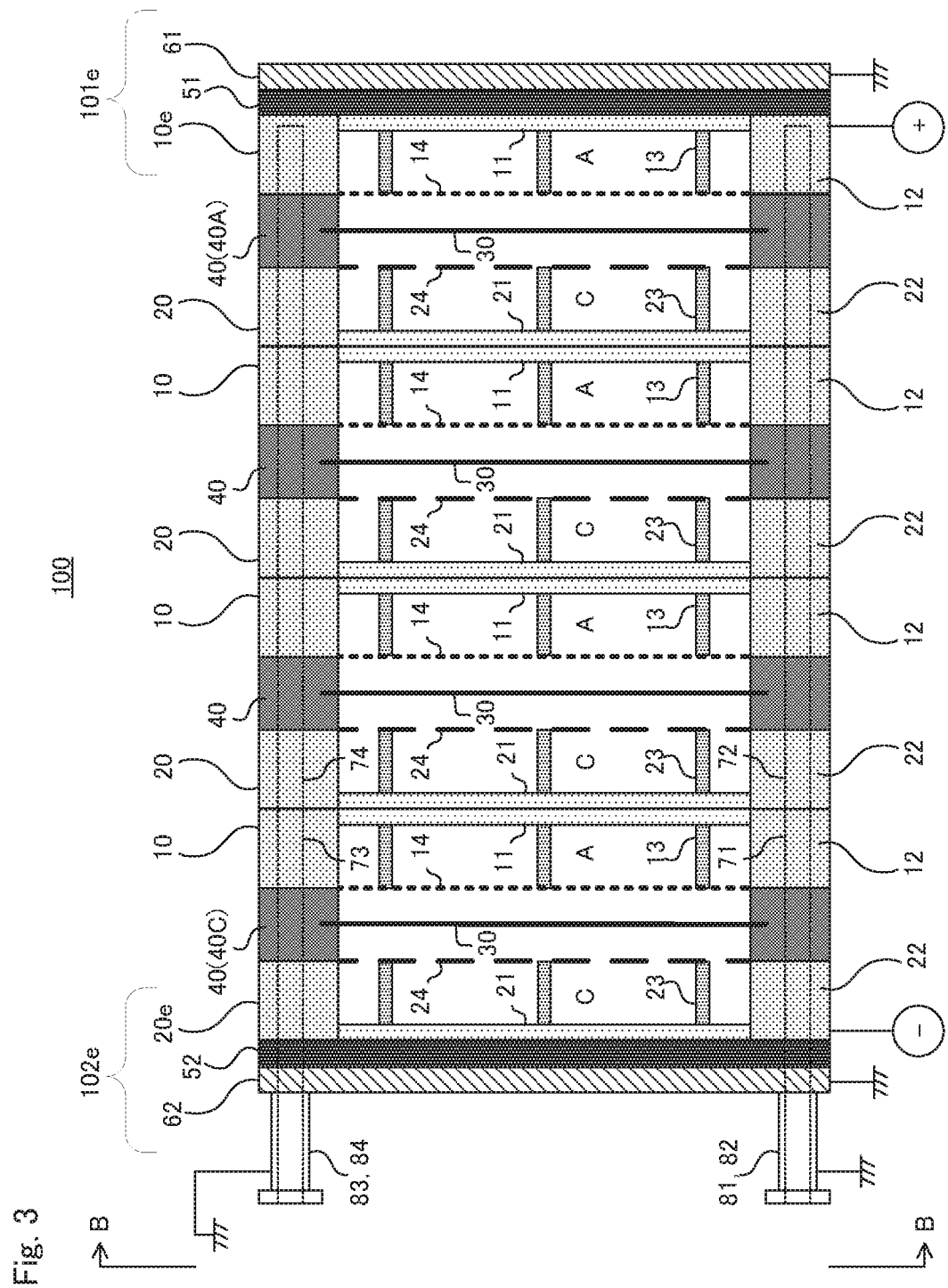
FIG. 3 is a schematically explanatory cross-sectional view of an electrolysis vessel 100 according to one embodiment of the present invention.
Figure 4:
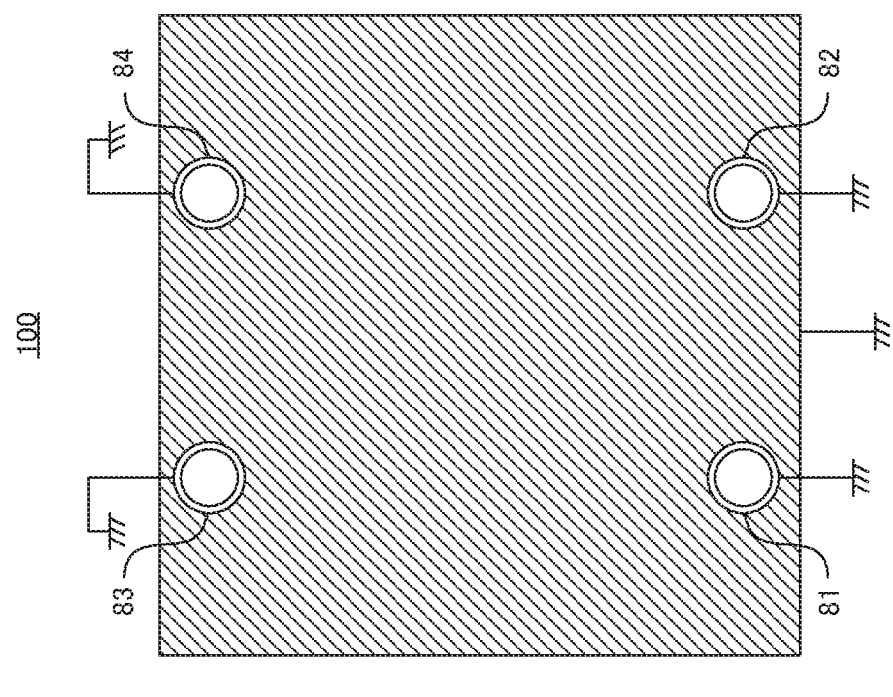
FIG. 4 shows FIG. 3 taken along the arrows B-B.

FIG. 3 is a schematically explanatory cross-sectional view of an electrolysis vessel 100 according to one embodiment of the present invention. The electrolysis vessel 100 is an electrolysis vessel for alkaline water electrolysis. FIG. 4 shows FIG. 3 taken along the arrows B-B. The upward and the downward in the vertical direction on each sheet of FIGS. 3 and 4 respectively correspond to the upward and the downward in a perpendicular direction. As shown in FIG. 3, the electrolysis vessel 100 comprises an anode end unit 101e, a cathode end unit 102e, a plurality of anode chamber cell 10, 10, . . . each comprising an anode 14 arranged therein and a first electroconductive separating back wall 11, the anode generating oxygen, a plurality of cathode chamber cell 20, 20, . . . each comprising a cathode 24 arranged therein and a second electroconductive separating back wall 21, the cathode generating hydrogen, and a plurality of ion-permeable separating membrane 30, 30, . . . each comprising a periphery held by a protecting member 40: the plurality of the anode chamber cell 10 and the plurality of the cathode chamber cell 20 are alternately arranged between the anode end unit 101e and the cathode end unit 102e. In the electrolysis vessel 100, each of the protecting members 40 is a gasket. Each adjacent pair of the plurality of separating membrane 30, 30 sandwiches therebetween a pair of the anode chamber cell 10 and the cathode chamber cell 20: the anode chamber cell 10 is arranged in a direction such that the first separating back wall 11 is directed toward the anode end unit 101e, and the cathode chamber cell 20 is arranged in a direction such that the second separating back wall 21 is directed toward the cathode end unit 102e: the anode chamber cell 10 and the cathode chamber cell 20 are arranged such that the first separating back wall 11 and the second separating back wall 21 adjoin each other. In the electrolysis vessel 100, each pair of the adjoined first separating back wall 11 and second separating back wall 21 are separate members.

Each of the anode chamber cells 10 includes the first separating back wall 11, a flange part 12 joined with or united into one body with a periphery of the first separating back wall 11, by which and the first separating back wall 11 and the separating membrane 30, an anode chamber A is defined, and electroconductive ribs 13, 13, . . . protruding from the first separating back wall 11. The anode 14 generating oxygen is held by the electroconductive ribs 13. Each of the cathode chamber cells 20 includes the second separating back wall 21, a flange part 22 joined with or united into one body with a periphery of the second separating back wall 21, by which and the second separating back wall 21 and the separating membrane 30, a cathode chamber C is defined, and electroconductive ribs 23, 23, . . . protruding from the second separating back wall 21. The cathode 24 generating hydrogen is held by the electroconductive ribs 23.

The anode end unit 101e comprises, in the sequence set forth from an anode-end-side of the electrolysis vessel (the right on the sheet of FIG. 3) an anode-side pressing frame 61, an anode-side insulating plate 51, and an anode end cell 10e. The cathode end unit 102e comprises, in the sequence set forth from a cathode-end-side of the electrolysis vessel (the left on the sheet of FIG. 3) a cathode-side pressing frame 62, a cathode-side insulating plate 52, and a cathode end cell 20e.

The anode end cell 10e includes the first separating back wall 11, the flange part 12, and the electroconductive ribs 13 as well as the anode chamber cells 10. The anode 14 generating oxygen is held by the electroconductive ribs 13. The cathode end cell 20e includes the second separating back wall 21, the flange part 22, and the electroconductive ribs 23 as well as the cathode chamber cells 20. The cathode 24 generating hydrogen is held by the electroconductive ribs 23.

Figure 5:
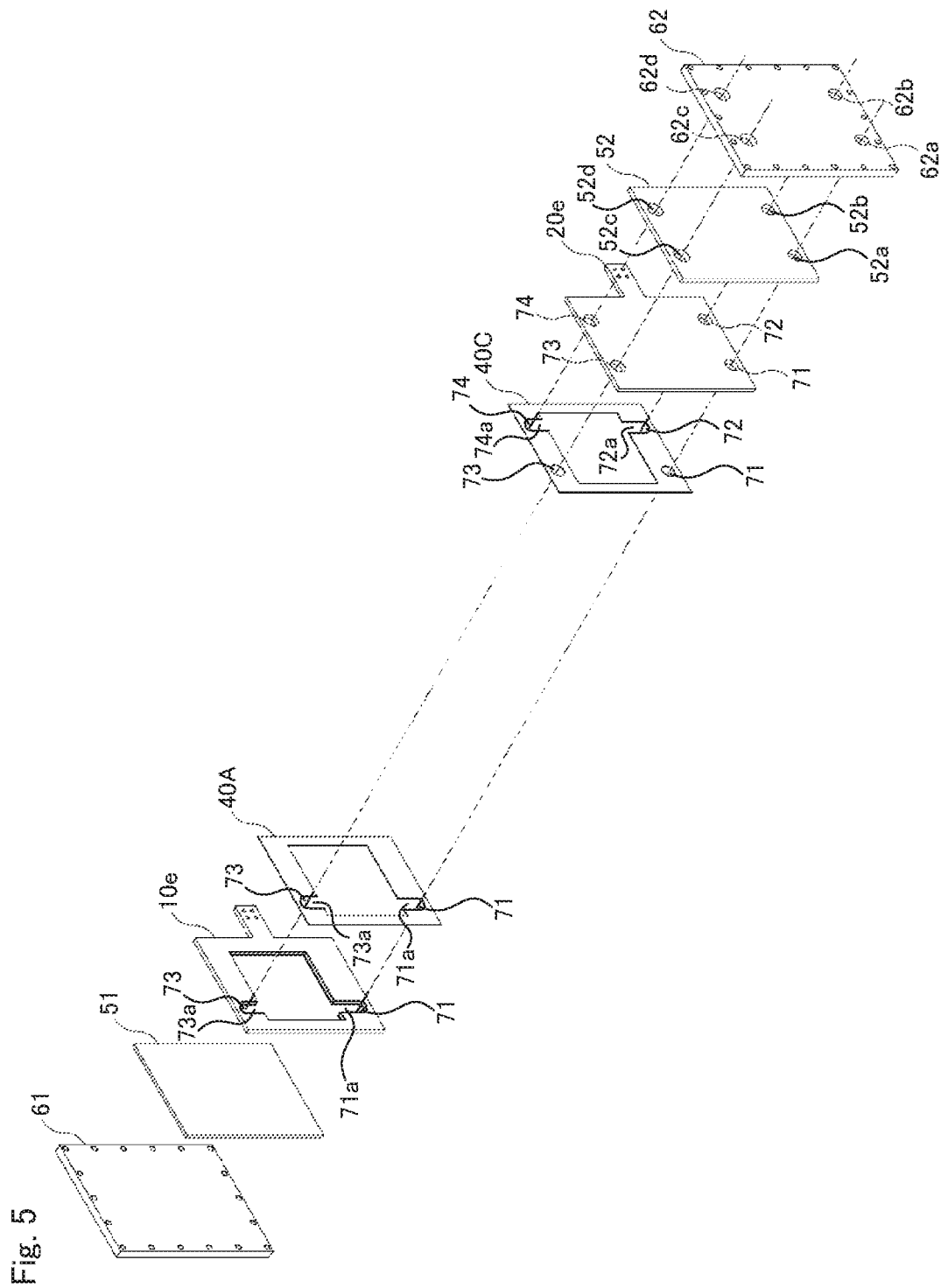
FIG. 5 is a schematically explanatory exploded-perspective view showing a manner of continuous anolyte supply flow path 71, catholyte supply flow path 72, anolyte-and-gas recovery flow path 73, and catholyte-and-gas recovery flow path 74 in the electrolysis vessel 100.

FIG. 5 will be further referred to in addition to FIGS. 3 and 4. FIG. 5 is a schematically explanatory exploded-perspective view showing a manner of continuous anolyte supply flow path 71, catholyte supply flow path 72, anolyte-and-gas recovery flow path 73, and catholyte-and-gas recovery flow path 74 in the electrolysis vessel 100. FIG. 5 only shows the anode-side pressing frame 61 and the cathode-side pressing frame 62, the anode-side insulating plate 51 and the cathode-side insulating plate 52, the anode end cell 10e and the cathode end cell 20e, and the protecting member 40 (40A) adjacent to the anode end cell 10e and the protecting member 40 (40C) adjacent to the cathode end cell 20e for easy understanding of the drawing, and the other elements are omitted. The electroconductive ribs 13 and 23 are also omitted.

The anolyte supply flow path 71 is arranged through a lower part of the anode end cell 10e, each lower part of the anode chamber cells 10, each lower part of the cathode chamber cells 20, a lower part of the cathode end cell 20e, and each lower part of the protecting members 40; and the anolyte-and-gas recovery flow path 73 is arranged through an upper part of the anode end cell 10e, each upper part of the anode chamber cells 10, each upper part of the cathode chamber cells 20, an upper part of the cathode end cell 20e, and each upper part of the protecting members 40. The anolyte supply flow path 71 communicates with the anode chambers A via an anolyte supply path 71a, and the anolyte-and-gas recovery flow path 73 communicates with the anode chambers A via an anolyte discharge path 73a. An anolyte is supplied from the anolyte supply flow path 71 to each anode chamber A via the anolyte supply path 71a, and the anolyte and gas generated at the anodes 14 are recovered from each anode chamber A to the anolyte-and-gas recovery flow path 73 via the anolyte discharge path 73a. Respective parts of the anolyte supply flow path 71 communicate with each other, and respective parts of the anolyte-and-gas recovery flow path 73 communicate with each other.

The catholyte supply flow path 72 is arranged through a lower part of the cathode end cell 20e, each lower part of the anode chamber cells 10, each lower part of the cathode chamber cells 20, and each lower part of the protecting members 40 other than the protecting member 40A adjacent to the anode end cell 10e; and the catholyte-and-gas recovery flow path 74 is arranged through an upper part of the cathode end cell 20e, each upper part of the anode chamber cells 10, each upper part of the cathode chamber cells 20, and each upper part of the protecting members 40 other than the protecting member 40A adjacent to the anode end cell 10e. The catholyte supply flow path 72 communicates with the cathode chambers C via a catholyte supply path 72a, and the catholyte-and-gas recovery flow path 74 communicates with the cathode chambers C via a catholyte discharge path 74a. A catholyte is supplied from the catholyte supply flow path 72 to each cathode chamber C via the catholyte supply path 72a, and the catholyte and gas generated at the cathodes 24 are recovered from each cathode chamber C to the catholyte-and-gas recovery flow path 74 via the catholyte discharge path 74a. Respective parts of the catholyte supply flow path 72 communicate with each other, and respective parts of the catholyte-and-gas recovery flow path 74 communicate with each other.

First through-holes 62a and 52a are arranged through the cathode-side pressing frame 62 and the cathode-side insulating plate 52 such that the first through-holes 62a and 52a communicate with the anolyte supply flow path 71, and an anolyte supply pipe 81 is connected with the anolyte supply flow path 71 via the first through-holes 62a and 52a and supplying the anolyte to the anolyte supply flow path 71.

Second through-holes 62b and 52b are arranged through the cathode-side pressing frame 62 and the cathode-side insulating plate 52 such that the second through-holes 62b and 52b communicate with the catholyte supply flow path 72, and a catholyte supply pipe 82 is connected with the catholyte supply flow path 72 via the second through-holes 62b and 52b and supplying the catholyte to the catholyte supply flow path 72.

Third through-holes 62c and 52c are arranged through the cathode-side pressing frame 62 and the cathode-side insulating plate 52 such that the third through-holes 62c and 52c communicate with the anolyte-and-gas recovery flow path 73, and an anolyte-and-gas recovery pipe 83 is connected with the anolyte-and-gas recovery flow path 73 via the third through-holes 62c and 52c and recovering the anolyte and gas from the anolyte-and-gas recovery flow path 73.

Fourth through-holes 62d and 52d are arranged through the cathode-side pressing frame 62 and the cathode-side insulating plate 52 such that the fourth through-holes 62d and 52d communicate with the catholyte-and-gas recovery flow path 74, and a catholyte-and-gas recovery pipe 84 is connected with the catholyte-and-gas recovery flow path 74 via the fourth through-holes 62d and 52d and recovering the catholyte and gas from the catholyte-and-gas recovery flow path 74.

Any alkali-resistant rigid electroconductive material can be used as the material of the separating back walls 11 and 21 without particular limitations. For example, a metallic material such as simple metals including nickel and iron, and stainless steel including SUS304, SUS310, SUS310S, SUS316 and SUS316L can be preferably employed. These metallic materials may be nickeled to use for improving corrosion resistance and electroconductivity. Any alkali-resistant rigid material can be used as the material of the flange parts 12 and 22 without particular limitations. For example, a metallic material such as simple metals including nickel and iron, and stainless steel including SUS304, SUS310, SUS310S, SUS316 and SUS316L, or a non-metal material such as reinforced plastics can be used. Among them, metallic materials may be nickeled for improving corrosion resistance. The separating back wall 11 and the flange part 12 in each of the anode chamber cells 10 and anode end cell 10e may be joined with each other by welding, adhesion, or the like, and may be formed of the same material into one body. Likewise, the separating back wall 21 and the flange part 22 in each of the cathode chamber cells 20 and cathode end cell 20e may be joined with each other by welding, adhesion, or the like, and may be formed of the same material into one body. The separating back wall 11 and the flange part 12 in each of the anode chamber cells 10 and anode end cell 10e are preferably formed of the same electroconductive material (such as a metallic material as described above) into one body, and the separating back wall 21 and the flange part 22 in each of the cathode chamber cells 20 and cathode end cell 20e are preferably formed of the same electroconductive material (such as a metallic material as described above) into one body, in view of an easy improvement in tolerance to the pressure inside each chamber.

Any anode that can be used for electrolysis vessels for alkaline water electrolysis can be used as the anodes 14 generating oxygen (hereinafter may be simply referred to as "anodes 14") without particular limitations. Each of the anodes 14 usually includes an electroconductive substrate, and a catalyst layer covering the surface of the substrate. The catalyst layer is preferably porous. As the electroconductive substrate for the anodes 14, for example, nickel, a nickel alloy, ferronickel, vanadium, molybdenum, copper, silver, manganese, a platinum group metal, graphite, or chromium, or any combination thereof can be preferably used. For the anodes 14, an electroconductive substrate formed of nickel can be preferably used. The catalyst layer includes nickel as an element. The catalyst layer preferably includes nickel oxide, metallic nickel or nickel hydroxide, or any combination thereof, and may include an alloy of nickel and at least one other metal. The catalyst layer is especially preferably formed of metallic nickel. The catalyst layer may further include chromium, molybdenum, cobalt, tantalum, zirconium, aluminum, zinc, a platinum group metal, or a rare earth element, or any combination thereof. Rhodium, palladium, iridium, or ruthenium, or any combination thereof may be further supported on the surface of the catalyst layer as an additional catalyst. The electroconductive substrate for the anodes 14 may be a rigid substrate, and may be a flexible substrate. Examples of the rigid electroconductive substrate forming the anodes 14 include expanded metals and punching metals. Examples of the flexible electroconductive substrate forming the anodes 14 include gauze woven (or knitted) out of metal wire.

Any cathode that can be used for electrolysis vessels for alkaline water electrolysis can be used as the cathodes 24 generating hydrogen (hereinafter may be simply referred to as "cathodes 24") without particular limitations. Each of the cathodes 24 usually includes an electroconductive substrate, and a catalyst layer covering the surface of the substrate. For the electroconductive substrate for the cathodes 24, for example, nickel, a nickel alloy, stainless steel, mild steel, a nickel alloy, nickeled stainless steel, or nickeled mild steel can be preferably employed. For the catalyst layer for the cathodes 24, a catalyst layer formed of a noble metal oxide, nickel, cobalt, molybdenum, or manganese, or an oxide or a noble metal oxide thereof can be preferably employed. The electroconductive substrate forming the cathodes 24 may be, for example, a rigid substrate, and may be a flexible substrate. Examples of the rigid electroconductive substrate forming the cathodes 24 include expanded metals and punching metals. Examples of the flexible electroconductive substrate forming the cathodes 24 include gauze woven (or knitted) out of metal wire.

As the electroconductive ribs 13 and 23, any known electroconductive ribs used for electrolysis vessels for alkaline water electrolysis can be used without particular limitations. In the electrolysis vessel 100, the electroconductive ribs 13 protrude from the separating back walls 11 of the respective anode chamber cells 10 and anode end cell 10e, and the electroconductive ribs 23 protrude from the separating back walls 21 of the respective cathode chamber cells 20 and cathode end cell 20e. The connecting way, shape, number, and arrangement of the electroconductive ribs 13 are not particularly limited as long as the electroconductive ribs 13 can fix and hold the anodes 14 to the anode chamber cells 10 and the anode end cell 10e. The connecting way, shape, number, and arrangement of the electroconductive ribs 23 are not particularly limited either as long as the electroconductive ribs 23 can fix and hold the cathodes 24 to the cathode chamber cells 20 and the cathode end cell 20e. For the material for the electroconductive ribs 13 and 23, any alkali-resistant rigid electroconductive material can be used without particular limitations, and for example, a metallic material such as simple metals including nickel and iron, and stainless steel including SUS304, SUS310, SUS310S, SUS316, and SUS3161, can be preferably employed. These metallic materials may be nickeled for improving corrosion resistance and electroconductivity.

As each of the ion-permeable separating membranes 30 (hereinafter may be simply referred to as "separating membranes 30"), any ion-permeable separating membrane that can be used for electrolysis vessels for alkaline water electrolysis can be used without particular limitations. Each of the separating membranes 30 desirably has low gas permeability, low electric conductivity, and high strength. Examples of each of the separating membranes 30 include a porous separating membrane such as a porous membrane formed of asbestos and of modified asbestos, a porous separating membrane using a polysulfone-based polymer, a cloth using a polyphenylene sulfide fiber, a fluorinated porous membrane, and a porous membrane using a hybrid material including both inorganic and organic materials. Other than these porous separating membranes, an ion-exchange membrane such as a fluorinated ion-exchange membrane can be used as each of the separating membranes 30.

In the electrolysis vessel 100, each of the protecting members 40 is formed of a gasket. Any insulating gasket that can be used for electrolysis vessels for alkaline water electrolysis can be used as the gasket forming the protecting member 40 without particular limitations. FIG. 3 shows a cross section of the gaskets. Each of the protecting members 40 has a flat shape, holds the periphery of the separating membrane 30, and at the same time is sandwiched between and held by adjacent flange part(s) 12 of the anode chamber cells 10 (or anode end cell 10e) and flange part(s) 22 of the cathode chamber cells 20 (or cathode end cell 20e). The gasket forming each of the protecting members 40 is preferably formed of an alkali-resistant elastomer. Examples of the material of the gasket include elastomers such as natural rubber (NR), styrene-butadiene rubber (SBR), polychloroprene (CR), butadiene rubber (BR), acrylonitrile-butadiene rubber (NBR), ethylene propylene rubber (EPT), ethylene propylene diene monomer rubber (EPDM), isobutylene isoprene rubber (IIR), and chlorosulfonated polyethylene rubber (CSM). When a gasket material that is not alkali-resistant is used, a layer of an alkali-resistant material may be arranged over the surface of the gasket material by coating or the like.

Any insulating plate that can be used for insulating an anode end cell and an anode-side pressing frame, and for insulating a cathode end cell and a cathode-side pressing frame in an electrolysis vessel for alkaline water electrolysis can be used as the anode-side insulating plate 51 and the cathode-side insulating plate 52 (hereinafter may be simply referred to as "insulating plates 51 and 52") without particular limitations. Examples of the material for the insulating plates 51 and 52 include rigid polyvinyl chloride resins, polypropylene resins, polyethylene resins, nylon resins, polyacetal resins, non-crystalline polyester resins, polyether ether ketone resins, polyetherimide resins, polyphenylene-sulfide resins, polybenzimidazole resins, polytetrafluoroethylene resins, tetrafluoroethylene-perfluoroalkyl vinyl ether copolymer resins, and tetrafluoroethylene-ethylene copolymer resins.

The anode-side pressing frame 61 and the cathode-side pressing frame 62 (hereinafter may be simply referred to as "pressing frames 61 and 62") are tied with a tie rod not shown, to unite the insulating plates 51 and 52, the anode chamber cells 10 and the anode end cell 10e, the cathode chamber cells 20 and the cathode end cell 20e, and the protecting members 40 and the separating membranes 30, which are arranged between the anode-side pressing frame 61 and the cathode-side pressing frame 62, into one body. The pressing frames 61 and 62 are formed of a metallic material having rigidity enough to bear the load of the above described tying. Examples of the metallic material forming the pressing frames 61 and 62 include carbon steel such as SS400, and stainless steel such as SUS304 and SUS316.

The anolyte supply pipe 81, the catholyte supply pipe 82, the anolyte-and-gas recovery pipe 83, and the catholyte-and-gas recovery pipe 84 (hereinafter all of them may be referred to together as "electrolyte supply/recovery pipes") each are a metal pipe comprising an inner surface, at least the inner surface of the metal pipe being coated with an insulating resin. Examples of the metallic material forming the anolyte supply pipe 81, the catholyte supply pipe 82, the anolyte-and-gas recovery pipe 83, and the catholyte-and-gas recovery pipe 84 include carbon steel such as SS400, stainless steel such as SUS304, SUS310 and SUS316, and nickel steel. As the insulating resin with which the inner surfaces of the anolyte supply pipe 81, the catholyte supply pipe 82, the anolyte-and-gas recovery pipe 83, and the catholyte-and-gas recovery pipe 84 are coated, an insulating and alkali-resistant resin material such as tetrafluoroethylene-perfluoroalkyl vinyl ether copolymer resins, and tetrafluoroethylene-ethylene copolymer resins can be used without particular limitations. Any known connection means such as screw-in connection, socket welding, butt welding, and flange connection can be used without particular limitations for the means for connecting the anolyte supply pipe 81, the catholyte supply pipe 82, the anolyte-and-gas recovery pipe 83, and the catholyte-and-gas recovery pipe 84 to the anolyte supply flow path 71, the catholyte supply flow path 72, the anolyte-and-gas recovery flow path 73, and the catholyte-and-gas recovery flow path 74 (hereinafter all of them may be referred to together as "electrolyte supply/recovery flow paths") via the first through-holes 62a and 52a, the second through-holes 62b and 52b, the third through-holes 62c and 52c, and the fourth through-holes 62d and 52d (hereinafter all of them may be referred to together as "through-holes") respectively. In case any metal member of the electrolyte supply/recovery pipes, or any metal member of the cathode-side pressing frame 62, or any metal member electrically connected therewith be exposed to any flow path of the electrolytes inside a space between the electrolyte supply/recovery pipes and the electrolyte supply/recovery flow paths when the electrolyte supply/recovery pipes (81 to 84) are connected to the electrolyte supply/recovery flow paths (71 to 74) via the through-holes (62a/52a to 62d/52d), for example, a surface of the metal member to be exposed to the flow path can be further coated with an insulating resin. As the insulating resin, the insulating resin same as that with which the inner surfaces of the electrolyte supply/recovery pipes are coated can be used without particular limitations.

The ratio of the length (unit: m) of the flow path inside the electrolyte supply/recovery pipes 81 to 84, each of which is a metal pipe, at least the inner surface of the metal pipe being coated with an insulating resin, to a cross-sectional area of the flow path (unit: m$^2$) (area of a cross section of a space inside the pipes which is perpendicular to the direction of the length of the pipes) is not particularly limited, but preferably no less than 100 m/m$^2$, and more preferably no less than 1,000 m/m$^2$, in view of bringing about the effect of the present invention more outstandingly. The upper limit is not particularly limited, and for example, can be less than 20,000 m/m$^2$. Concerning the "length of the flow path", if the metal pipe is bending, the shortest path shall be employed. For example, the length of the shortest path inside the bending metal pipe can be known as a length of a portion inside the metal pipe which thread passes, by passing the thread inside the metal pipe across the entire length of the metal pipe, and pulling the thread from both ends of the metal pipe so that the thread is not slack. Concerning the "cross-sectional area", if the cross-sectional area varies according to a position inside the pipe, the maximum value shall be employed.

An anode terminal is connected to the anode end cell 10e, and a cathode terminal is connected to the cathode end cell 20e. The anode-side pressing frame 61, the cathode-side pressing frame 62, the anolyte supply pipe 81, the catholyte supply pipe 82, the anolyte-and-gas recovery pipe 83, and the catholyte-and-gas recovery pipe 84 are all electrically grounded.

In the electrolysis vessel 100, at the junction of the anolyte supply pipe 81 and the anolyte supply flow path 71 and at the junction of the anolyte-and-gas recovery pipe 83 and the anolyte-and-gas recovery flow path 73, the anolyte does not contact with any metal member of the anolyte supply pipe 81, any metal member of the anolyte-and-gas recovery pipe 83, any metal member of the anode-side pressing frame 61, any metal member of the cathode-side pressing frame 62, or any metal member electrically connected therewith; at the junction of the catholyte supply pipe 82 and the catholyte supply flow path 72 and at the junction of the catholyte-and-gas recovery pipe 84 and the catholyte-and-gas recovery flow path 74, the catholyte does not contact with any metal member of the catholyte supply pipe 82, any metal member of the anolyte-and-gas recovery pipe 83, any metal member of the anode-side pressing frame 61, any metal member of the cathode-side pressing frame 62, or any metal member electrically connected therewith. Thus, the electrolysis vessel 100 can increase the resistance against ionic conductivity (solution resistance) from working electrodes to counter electrodes in a reverse reaction accompanied by a leakage current. This can suppress influence of a leakage current even when an unstable power supply is used.

In view of making the effect of the present invention outstanding, the amount of hydrogen gas generated per unit time by the main reaction when the electrolysis vessel of the present invention is operated with the minimum electric current is preferably less than 10%, more preferably less than 5%, in one embodiment no less than 1%, and in another embodiment no less than 2% of the amount of hydrogen gas generated per unit time by the main reaction when the electrolysis vessel of the present invention is operated with the maximum electric current. In the present description, "maximum electric current" and "minimum electric current" respectively mean the maximum value and the minimum value of an electric current flowing in the electrolysis vessel.

The effect of such an electrolysis vessel 100 is outstanding especially when electrolysis is performed as the pressure inside at least one of each of anode chambers and each of cathode chambers is kept higher than atmospheric pressure. As an electrolyte supply/recovery pipe supplying electrolytes to an electrolysis vessel and recovering the electrolytes and gas from the electrolysis vessel, a resin pipe such as a flexible hose is used because of easiness in view of handling of the pipe, etc. When a chamber is pressurized however, the inside of the electrolyte supply/recovery pipe is also pressurized, which makes it difficult to use a resin pipe such as a flexible hose as the electrolyte supply/recovery pipe due to its strength. Thus, it is desirable to use a metal pipe as an electrolyte supply/recovery pipe connected to an electrolysis vessel with which electrolysis is performed under pressurized conditions. While a metal pipe is necessary to be electrically grounded for safety, influence of a leakage current due to the electrically grounded metal pipe functioning as a counter electrode cannot be ignored when an unstable power supply is used in such an electrolysis vessel as a power supply. In contrast, the electrolysis vessel 100 can suppress influence of a leakage current even when electrolysis is performed using an unstable power supply under pressurized conditions where it is necessary to use a metal pipe as an electrolyte supply/recovery pipe.

When electrolysis is performed as the pressure in at least one of each of the anode chambers and each of the cathode chambers is kept higher than atmospheric pressure, the pressure inside each cathode chamber is preferably higher than atmospheric pressure by 20 kPa or more, more preferably higher than atmospheric pressure by 400 kPa or more, and further preferably higher than atmospheric pressure by 800 kPa or more. The upper limit of the pressure inside each cathode chamber can be, for example, less than "atmospheric pressure plus 1000 kPa", depending on the strength of the members forming the electrolysis vessel though. The pressure inside each cathode chamber at this lower limit or more can lower the compression ratio in the compression step after hydrogen gas is retrieved from the cathode chambers, or makes it possible to omit this compression step, which can reduce costs for equipment, and achieve space saving and energy efficiency for the entire equipment. The pressure inside each cathode chamber at this lower limit or more also makes the size of air bubbles generated in the cathode chambers small, which reduces the resistance between the anodes and the cathodes, and thus can lower the electrolysis voltage.

When electrolysis is performed as the pressure in at least one of each of the anode chambers and each of the cathode chambers is kept higher than atmospheric pressure, the pressure inside each anode chamber is preferably higher than atmospheric pressure by 20 kPa or more, more preferably higher than atmospheric pressure by 400 kPa or more, and further preferably higher than atmospheric pressure by 800 kPa or more. The upper limit of the pressure inside each anode chamber can be, for example, less than "atmospheric pressure plus 1000 kPa", depending on the strength of the members forming the electrolysis vessel though. The pressure inside each anode chamber at this lower limit or more can lower the compression ratio in the compression step after oxygen gas is retrieved from the anode chambers, or makes it possible to omit this compression step, which can further reduce costs for equipment, and achieve further space saving and energy efficiency for the entire equipment. The pressure inside each anode chamber at this lower limit or more also makes the size of air bubbles generated in the anode chambers further small, which further reduces the resistance between the anodes and the cathodes, and thus can further lower the electrolysis voltage.

The difference in the pressure between the insides of each cathode chamber and each anode chamber is, for example, preferably less than 5.0 kPa, and more preferably less than 1.0 kPa. The difference in the pressure between the insides of each cathode chamber and each anode chamber less than this upper limit makes it easy to suppress gas migration through the separating membranes to move from the anode chambers to the cathode chambers, or from the cathode chambers to the anode chambers, which is caused by the pressure difference between the anode chambers and the cathode chambers, and to suppress such a situation that the separating membranes are damaged due to the pressure difference between the anode chambers and the cathode chambers.

The above description concerning the present invention showed the electrolysis vessel 100 including the electrolyte supply/recovery pipes 81 to 84 respectively connected to the electrolyte supply/recovery flow paths 71 to 74 via the first to fourth through-holes 62a/52a to 62d/52d arranged through the cathode-side pressing frame 62 and the cathode-side insulating plate 52 as an example. The present invention is not limited to this embodiment. For example, the electrolysis vessel can include electrolyte supply/recovery pipes, at least one of which is connected to a corresponding electrolyte supply/recovery flow path via through-holes arranged through the anode-side pressing frame and the anode-side insulating plate.

Figure 6:
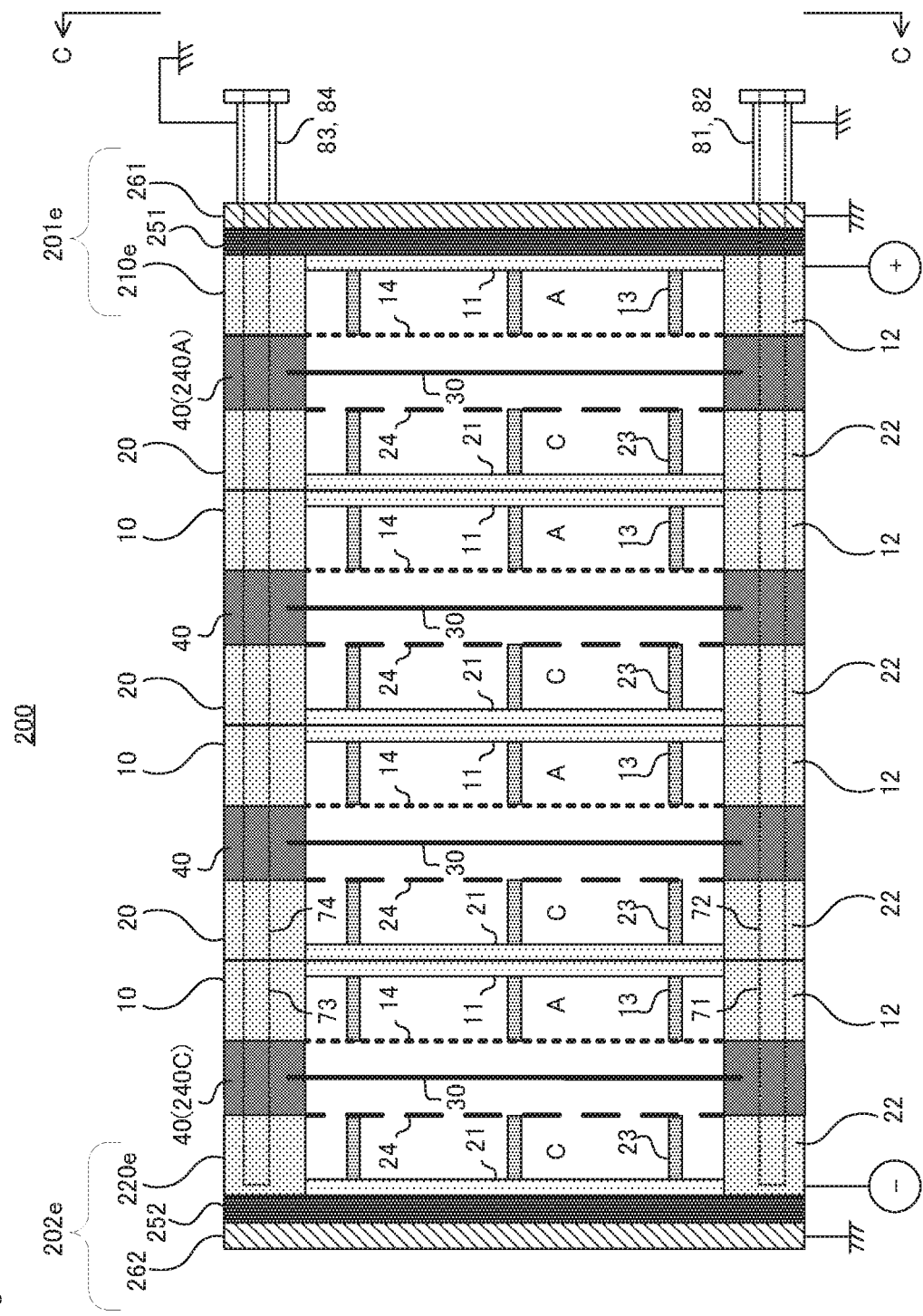
FIG. 6 is a schematically explanatory cross-sectional view of an electrolysis vessel 200 according to another embodiment of the present invention.
Figure 7:
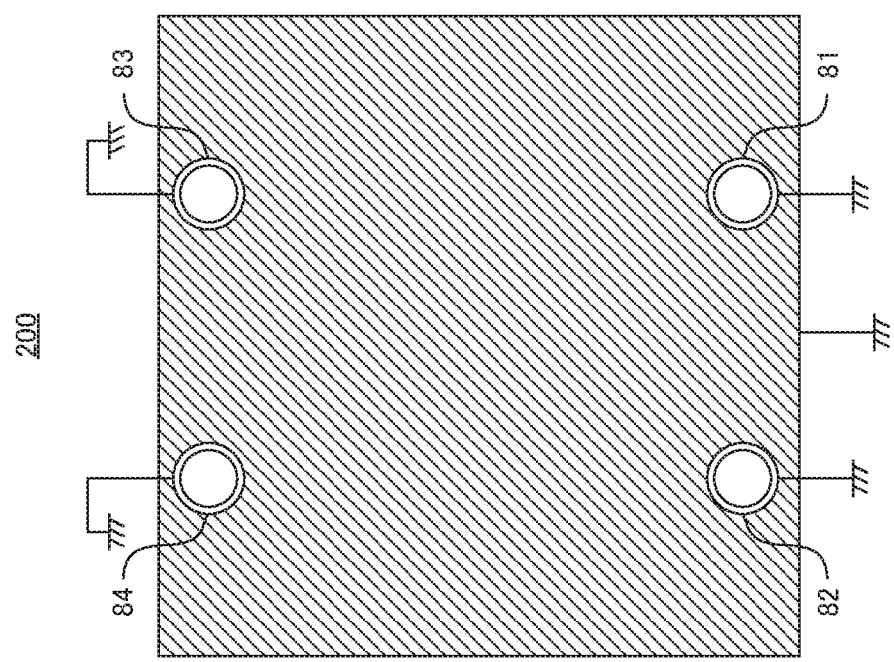
FIG. 7 shows FIG. 6 taken along the arrows C-C.
Figure 8:
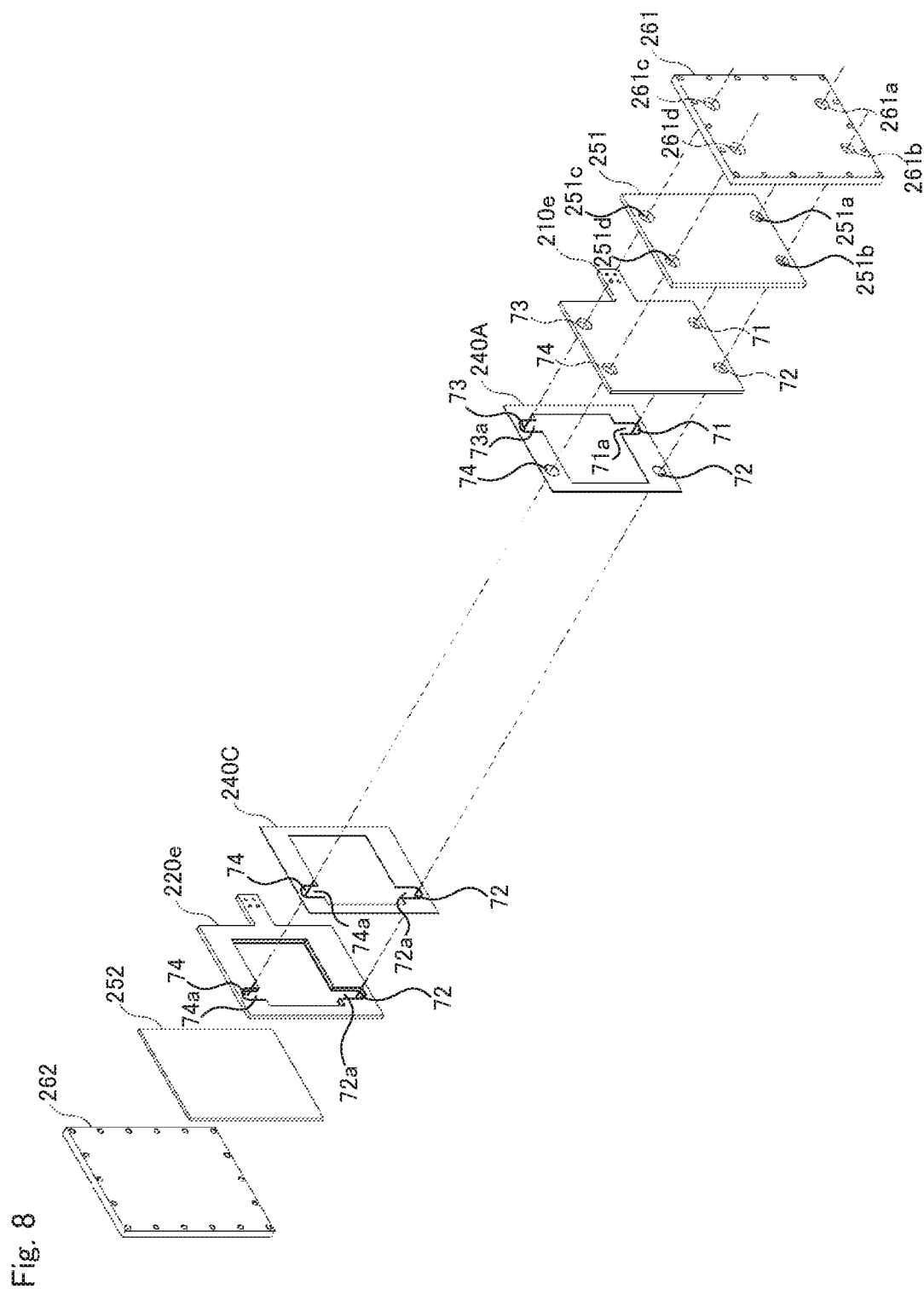
FIG. 8 is a schematically explanatory exploded-perspective view showing a manner of the continuous anolyte supply flow path 71, catholyte supply flow path 72, anolyte-and-gas recovery flow path 73, and catholyte-and-gas recovery flow path 74 in the electrolysis vessel 200.

FIG. 6 is a schematically explanatory cross-sectional view of an electrolysis vessel 200 according to such another embodiment. The electrolysis vessel 200 is an electrolysis vessel for alkaline water electrolysis. FIG. 7 shows FIG. 6 taken along the arrows C-C. The upward and the downward in the vertical direction on each sheet of FIGS. 6 and 7 respectively correspond to the upward and the downward in a perpendicular direction. FIG. 8 is a schematically explanatory exploded-perspective view showing a manner of the continuous anolyte supply flow path 71, the catholyte supply flow path 72, the anolyte-and-gas recovery flow path 73, and the catholyte-and-gas recovery flow path 74 in the electrolysis vessel 200. In FIGS. 6 to 8, the elements already shown in FIGS. 3 to 5 are given the same reference signs as in FIGS. 3 to 5, and the description thereof may be omitted.

The electrolysis vessel 200 is different from the electrolysis vessel 100 in including an anode end unit 201e instead of the anode end unit 101e, and a cathode end unit 202e instead of the cathode end unit 102e, the electrolyte supply/recovery pipes 81 to 84 being connected to the cathode end unit 201e. The anode end unit 201e is different from the anode end unit 101e in including an anode end cell 210e instead of the anode end cell 10e, an anode-side insulating plate 251 instead of the anode-side insulating plate 51, and an anode-side pressing frame 261 instead of the anode-side pressing frame 61. The cathode end unit 202e is different from the cathode end unit 102e in including a cathode end cell 220e instead of the cathode end cell 20e, a cathode-side insulating plate 252 instead of the cathode-side insulating plate 52, and a cathode-side pressing frame 262 instead of the cathode-side pressing frame 62. The cathode-side pressing frame 262 is different from the cathode-side pressing frame 62 in including no first to fourth through-holes 62a to 62d. The cathode-side insulating plate 252 is different from the cathode-side insulating plate 52 in including no first to fourth through-holes 52a to 52d.

FIG. 8 only shows the anode-side pressing frame 261 and the cathode-side pressing frame 262, the anode-side insulating plate 251 and the cathode-side insulating plate 252, the anode end cell 210e and the cathode end cell 220e, and the protecting member 40 (240A) adjacent to the anode end cell 210e and the protecting member 40 (240C) adjacent to the cathode end cell 220e for easy understanding of the drawing, and the other elements are omitted. The electroconductive ribs 13 and 23 are also omitted.

The catholyte supply flow path 72 is arranged through a lower part of the anode end cell 210e, each lower part of the anode chamber cells 10, each lower part of the cathode chamber cells 20, a lower part of the cathode end cell 220e, and each lower part of the protecting members 40; and the catholyte-and-gas recovery flow path 74 is arranged through an upper part of the anode end cell 210e, each upper part of the anode chamber cells 10, each upper part of the cathode chamber cells 20, an upper part of the cathode end cell 220e, and each upper part of the protecting members 40. The catholyte supply flow path 72 communicates with the cathode chambers C via the catholyte supply path 72a, and the catholyte-and-gas recovery flow path 74 communicates with the cathode chambers C via the catholyte discharge path 74a. The catholyte is supplied from the catholyte supply flow path 72 to each cathode chamber C via the catholyte supply path 72a, and the catholyte and gas generated at the cathodes 24 are recovered from each cathode chamber C to the catholyte-and-gas recovery flow path 74 via the catholyte discharge path 74a. Respective parts of the catholyte supply flow path 72 communicate with each other, and respective parts of the catholyte-and-gas recovery flow path 74 communicate with each other.

The anolyte supply flow path 71 is arranged through a lower part of the anode end cell 210e, each lower part of the anode chamber cells 10, each lower part of the cathode chamber cells 20, and each lower part of the protecting members 40 other than the protecting member 40 (240C) adjacent to the cathode end cell 220e; and the anolyte-and-gas recovery flow path 73 is arranged through an upper part of the anode end cell 210e, each upper part of the anode chamber cells 10, each upper part of the cathode chamber cells 20, and each upper part of the protecting members 40 other than the protecting member 40 (240C) adjacent to the cathode end cell 220e. The anolyte supply flow path 71 communicates with the anode chambers A via the anolyte supply path 71a, and the anolyte-and-gas recovery flow path 73 communicates with the anode chambers A via the anolyte discharge path 73a. The anolyte is supplied from the anolyte supply flow path 71 to each anode chamber A via the anolyte supply path 71a, and the anolyte and gas generated at the anodes 14 are recovered from each anode chamber A to the anolyte-and-gas recovery flow path 73 via the anolyte discharge path 73a. Respective parts of the anolyte supply flow path 71 communicate with each other, and respective parts of the anolyte-and-gas recovery flow path 73 communicate with each other.

First through-holes 261a and 251a are arranged through the anode-side pressing frame 261 and the anode-side insulating plate 251 such that the first through-holes 261a and 251a communicate with the anolyte supply flow path 71, and the anolyte supply pipe 81 is connected with the anolyte supply flow path 71 via the first through-holes 261a and 251a and supplying the anolyte to the anolyte supply flow path.

Second through-holes 261b and 251b are arranged through the anode-side pressing frame 261 and the anode-side insulating plate 251 such that the second through-holes 261b and 251b communicate with the catholyte supply flow path 72, and the catholyte supply pipe 82 is connected with the catholyte supply flow path 72 via the second through-holes 261b and 251b and supplying the catholyte to the catholyte supply flow path.

Third through-holes 261c and 251c are arranged through the anode-side pressing frame 261 and the anode-side insulating plate 251 such that the third through-holes 261c and 251c communicate with the anolyte-and-gas recovery flow path 73, and the anolyte-and-gas recovery pipe 83 is connected with the anolyte-and-gas recovery flow path 73 via the third through-holes 261c and 251c and recovering the anolyte and gas from the anolyte-and-gas recovery flow path.

Fourth through-holes 261d and 251d are arranged through the anode-side pressing frame 261 and the anode-side insulating plate 251 such that the fourth through-holes 261d and 251d communicate with the catholyte-and-gas recovery flow path 74, and the catholyte-and-gas recovery pipe 84 is connected with the catholyte-and-gas recovery flow path 74 via the fourth through-holes 261d and 251d and recovering the catholyte and gas from the catholyte-and-gas recovery flow path.

The same connection means as that in the above description concerning the electrolysis vessel 100 can be used without particular limitations for the means for connecting the electrolyte supply/recovery pipes 81 to 84 to the electrolyte supply/recovery flow paths 71 to 74 via the first to fourth through-holes 261a/251a to 261d/251d respectively. In case any metal member of the electrolyte supply/recovery pipes, or any metal member of the anode-side pressing frame 261, or any metal member electrically connected therewith be exposed to any flow path of the electrolytes inside a space between the electrolyte supply/recovery pipes and the electrolyte supply/recovery flow paths when the electrolyte supply/recovery pipes (81 to 84) are connected to the electrolyte supply/recovery flow paths (71 to 74) via the first to fourth through-holes (62a/52a to 62d/52d), for example, a surface of the metal member to be exposed to the flow path can be further coated with an insulating resin.

An anode terminal is connected to the anode end cell 210e, and a cathode terminal is connected to the cathode end cell 220e. The anode-side pressing frame 261, the cathode-side pressing frame 262, the anolyte supply pipe 81, the catholyte supply pipe 82, the anolyte-and-gas recovery pipe 83, and the catholyte-and-gas recovery pipe 84 are all electrically grounded.

In the electrolysis vessel 200, at the junction of the anolyte supply pipe 81 and the anolyte supply flow path 71 and at the junction of the anolyte-and-gas recovery pipe 83 and the anolyte-and-gas recovery flow path 73, the anolyte does not contact with any metal member of the anolyte supply pipe 81, any metal member of the anolyte-and-gas recovery pipe 83, any metal member of the anode-side pressing frame 261, any metal member of the cathode-side pressing frame 262, or any metal member electrically connected therewith; at the junction of the catholyte supply pipe 82 and the catholyte supply flow path 72 and at the junction of the catholyte-and-gas recovery pipe 84 and the catholyte-and-gas recovery flow path 74, the catholyte does not contact with any metal member of the catholyte supply pipe 82, any metal member of the catholyte-and-gas recovery pipe 84, any metal member of the anode-side pressing frame 261, any metal member of the cathode-side pressing frame 262, or any metal member electrically connected therewith. Thus, the electrolysis vessel 200 can increase the resistance against ionic conductivity (solution resistance) from working electrodes to counter electrodes in a reverse reaction accompanied by a leakage current. This can suppress influence of a leakage current even when an unstable power supply such that the amount of hydrogen gas generated by the main reaction when the electrolysis vessel 200 is operated with the minimum electric current is less than 10% of that when the electrolysis vessel 200 is operated with the maximum electric current is used.

The above description concerning the present invention showed the electrolysis vessels 100 and 200 each including pairs of the adjacent separating back walls 11 of the anode chamber cells 10 and separating back walls 21 of the cathode chamber cells 20 which do not sandwich therebetween any separating membrane 30 held by the protecting member 40 and which are separate members as an example. The present invention is not limited to these embodiments. For example, the electrolysis vessel can include a pair of adjacent separating back walls of an anode chamber cell and a cathode chamber cell which does not sandwich therebetween the separating membrane held by the protecting member and which is formed into one body.

Figure 9:
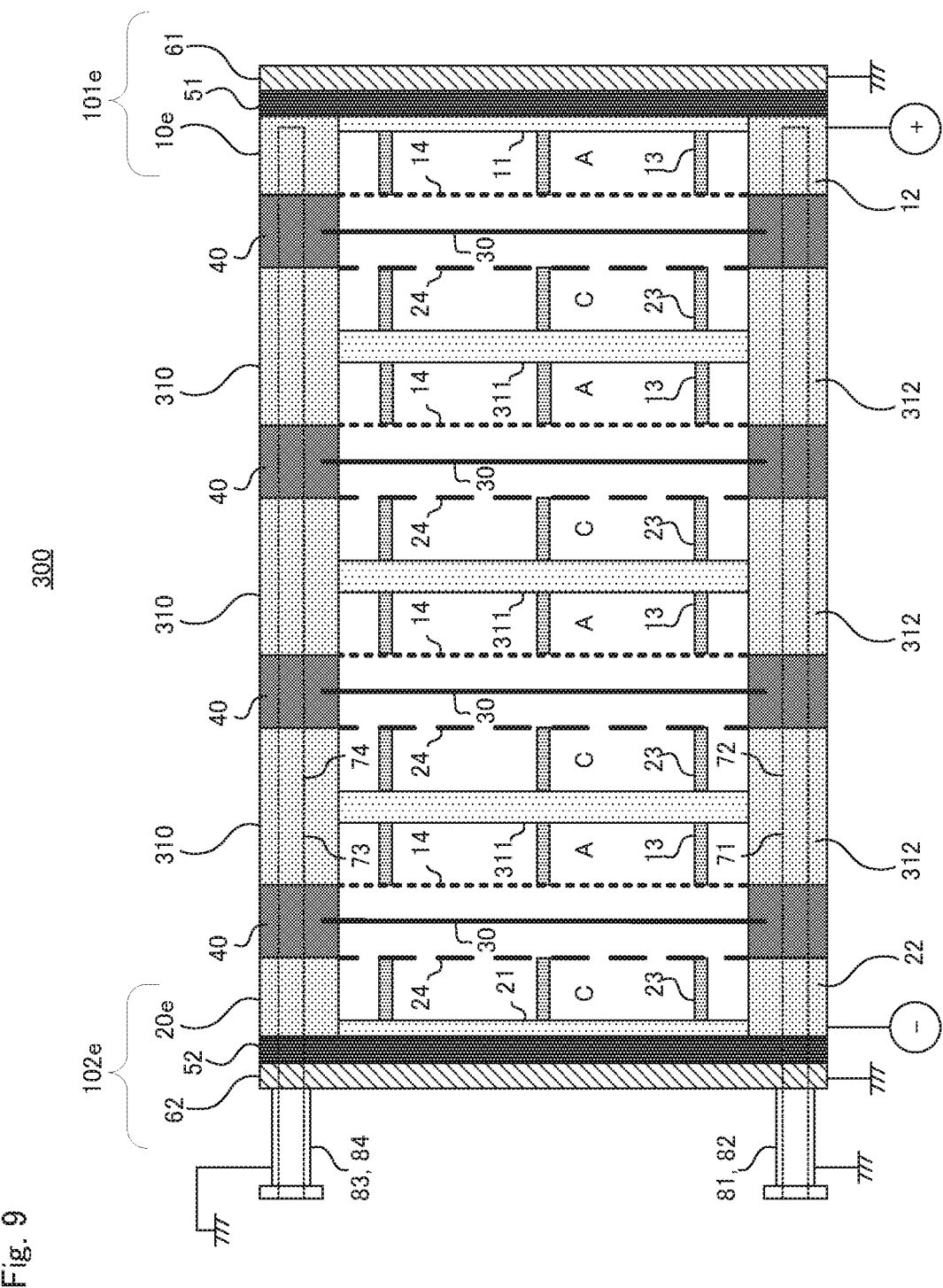
FIG. 9 is a schematically explanatory cross-sectional view of an electrolysis vessel 300 according to another embodiment.

FIG. 9 is a schematically explanatory cross-sectional view of an electrolysis vessel 300 according to such another embodiment. The electrolysis vessel 300 is an electrolysis vessel for alkaline water electrolysis. In FIG. 9, the elements already shown in FIGS. 3 to 8 are given the same reference signs as in FIGS. 3 to 8, and the description thereof may be omitted. The upward and the downward in the vertical direction on the sheet of FIG. 9 respectively correspond to the upward and the downward in a perpendicular direction. The electrolysis vessel 300 is different from the electrolysis vessel 100 (FIG. 3) in including integrated chamber cells 310 instead of the anode chamber cells 10 and the cathode chamber cells 20. In each of the integrated chamber cells 310, a pair of the adjacent separating back wall 11 of the anode chamber cell 10 and separating back wall 21 of the cathode chamber cell 20 is formed into one body to be an integrated separating back wall 311. In each of the integrated chamber cells 310, a pair the adjacent flange part 12 of the anode chamber cell 10 and flange part 22 of the cathode chamber cell 20 is formed into one body to be an integrated flange part 312 extending towards both the anode chamber (the left on the sheet of FIG. 9) and the cathode chamber (the right on the sheet of FIG. 9) of the separating back wall 311. Such an electrolysis vessel 300 also makes it possible to obtain the same effect as that described above concerning the electrolysis vessel 100 (FIGS. 3 to 5).

The above description concerning the present invention showed the electrolysis vessels 100, 200 and 300 each including the protecting members 40 each formed of a gasket as an example. The present invention is not limited to these embodiments. For example, the electrolysis vessel can include a protecting member obtained by coating a surface of a metal plate with an elastomer.

Figure 10:
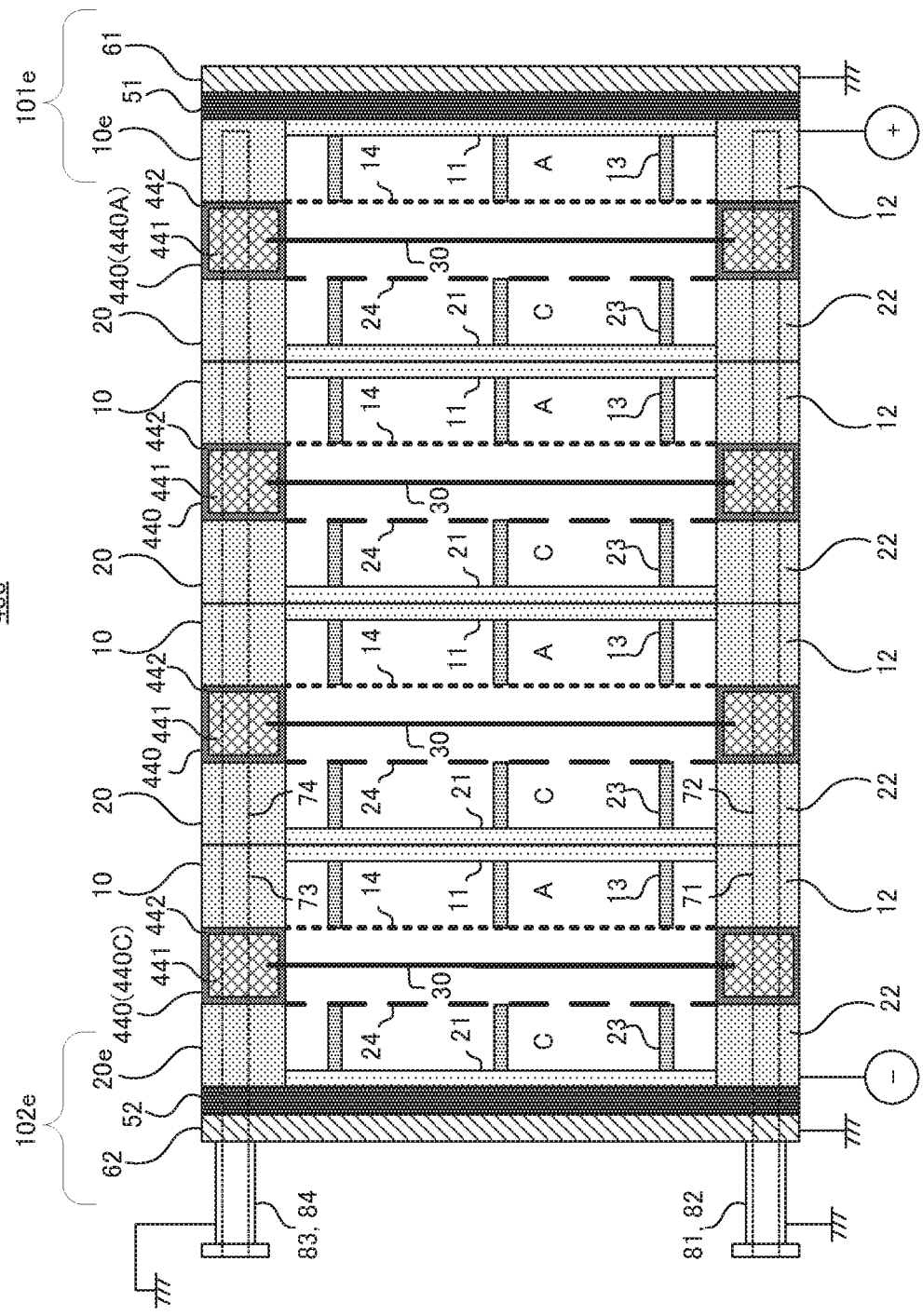
FIG. 10 is a schematically explanatory cross-sectional view of an electrolysis vessel 400 according to another embodiment.

FIG. 10 is a schematically explanatory cross-sectional view of an electrolysis vessel 400 according to such another embodiment. The electrolysis vessel 400 is an electrolysis vessel for alkaline water electrolysis. In FIG. 10, the elements already shown in FIGS. 3 to 9 are given the same reference signs as in FIGS. 3 to 9, and the description thereof may be omitted. The upward and the downward in the vertical direction on the sheet of FIG. 10 respectively correspond to the upward and the downward in a perpendicular direction. The electrolysis vessel 400 is different from the electrolysis vessel 100 (FIGS. 3 to 5) in including protecting members 440 instead of the protecting members 40. The protecting members 440 are different from the protecting members 40 in each including a metal plate 441, and an insulating elastomer coating 442 arranged over the surface of the metal plate 441. As well as the protecting members 40, the anolyte supply flow path 71 is arranged through each lower part of the protecting members 440, and the anolyte-and-gas recovery flow path 73 is arranged through each upper part of the protecting members 440. The catholyte supply flow path 72 is arranged through each lower part of the protecting members 440 other than a protecting member 440A adjacent to the anode end cell 10e, and the catholyte-and-gas recovery flow path 74 is arranged through each upper part of the protecting members 440 other than the protecting member 440A adjacent to the anode end cell 10. The periphery of each of the separating membranes 30 is held by a slit part communicating with the elastomer coating 442 and the metal plate 441 of the protecting member 440. Such an electrolysis vessel 400 also makes it possible to obtain the same effect as that described above concerning the electrolysis vessel 100 (FIGS. 3 to 5).

Any alkali-resistant rigid metallic material can be preferably used as the metallic material forming the metal plate 441. For example, a metallic material such as simple metals including nickel and iron, and stainless steel including SUS304, SUS310, SUS310S, SUS316, and SUS316L can be preferably employed. These metallic materials may be nickeled to use for improving corrosion resistance.

Any insulating and alkali-resistant elastomer can be preferably used as the elastomer forming the elastomer coating 442. Examples of such an elastomer include natural rubber (NR), styrene-butadiene rubber (SBR), polychloroprene (CR), butadiene rubber (BR), acrylonitrile-butadiene rubber (NSR), ethylene propylene rubber (EPT), ethylene propylene diene monomer rubber (EPDM), isobutylene isoprene rubber (IIR), and chlorosulfonated polyethylene rubber (CSM). When an elastomer that is not alkali-resistant is used, a layer of an alkali-resistant material may be arranged over the surface of this elastomer by coating or the like.

Figure 11:
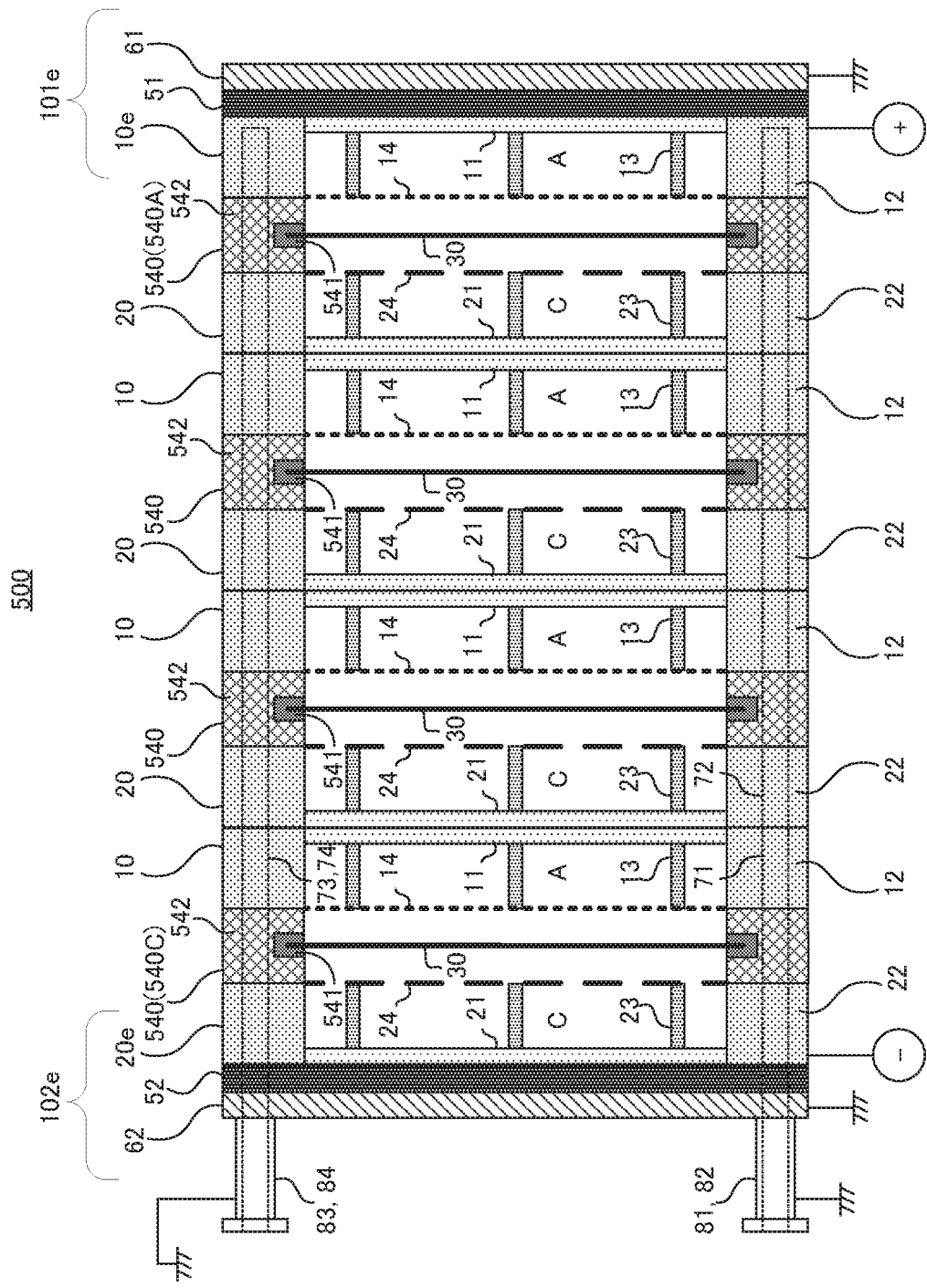
FIG. 11 is a schematically explanatory cross-sectional view of an electrolysis vessel 500 according to another embodiment.

FIG. 11 is a schematically explanatory cross-sectional view of an electrolysis vessel 500 according to further another embodiment of the present invention. The electrolysis vessel 500 is an electrolysis vessel for alkaline water electrolysis. In FIG. 11, the elements already shown in FIGS. 3 to 10 are given the same reference signs as in FIGS. 3 to 10, and the description thereof may be omitted. The upward and the downward in the vertical direction on the sheet of FIG. 11 respectively correspond to the upward and the downward in a perpendicular direction. The electrolysis vessel 500 is different from the electrolysis vessel 300 (FIG. 9) in including protecting members 540 instead of the protecting members 40. The protecting members 540 are different from the protecting members 40 in each including a gasket 541 sandwiching therebetween and holding thereby the periphery of each of the separating membranes 30, and a resin holding member 542 holding the gasket 541, the holding member 542 being sandwiched between and held by each pair of the chamber cells. As well as the protecting members 40, the anolyte supply flow path 71 is arranged through each lower part of the protecting members 540, and the anolyte-and-gas recovery flow path 73 is arranged through each upper part of the protecting members 540. The catholyte supply flow path 72 is arranged through each lower part of the protecting members 540 other than a protecting member 540A adjacent to the anode end cell 10e, and the catholyte-and-gas recovery flow path 74 is arranged through each upper part of the protecting members 540 other than the protecting member 540A adjacent to the anode end cell 10.

FIGS. 12A to 12C are explanatory cross-sectional views of the protecting member 540 in the electrolysis vessel 500 in further detail. The upward and the downward in the vertical direction on the sheet of FIGS. 12A to 12C respectively correspond to the upward and the downward in a perpendicular direction. FIG. 12A is a cross-sectional view showing a position where the protecting member 540 is exploded. As described above, each of the protecting members 540 includes the gasket 541 holding the periphery of each of the separating membranes 30, and the resin holding member 542 holding the gasket 541. The holding member 542 includes a base body frame 5421 and a lid frame 5422. The electrolyte supply/recovery flow paths 71 to 74 are provided on the outer peripheral side of the base body frame 5421. The base body frame 5421 includes a receiving part 5421a arranged in an inner periphery of the base body frame 5421 and having dimensions such that the gasket 541 can be received therein, and a supporting part 5421b protruding from the receiving part 5421a and extending toward an inner periphery side of the base body 5421, and supporting the gasket 541 when the gasket 541 is received in the receiving part 5421a in a stacking direction of the chamber cells and the protecting members 540 (direction across the sheet of FIGS. 12A to 12C between left and right, which may be hereinafter simply referred to as "stacking direction"). FIG. 12B is a cross-sectional view showing a position where the gasket 541 is received in the receiving part 5421a of the base body frame 5421 and is supported by the supporting part 5421b in the stacking direction. The receiving part 5421a has a depth larger than the thickness of the gasket 541 holding the periphery of the separating membrane 30, in the stacking direction. Thus, when the gasket 541 holding the separating membrane 30 is received in the receiving part 5421a and supported by the supporting part 5421b in the stacking direction, a difference in levels is formed between a face 541a of the gasket 541 received in the receiving part 5421a which is on the opposite side of the supporting part 5421b, and a face 5421c of the base body frame 5421 which is on the opposite side of the supporting part 5421b (FIG. 12B). The lid frame 5422 has dimensions such that the lid frame 5422 can be received in the difference in levels between the face 5421c of the base body frame 5421 including the receiving part 5421a, which receives the gasket 541, and the face 541a of the gasket. That is, the outer periphery of the lid frame 5422 has approximately the same dimensions as the inner periphery of the receiving part 5421a of the base body frame 5421, the inner periphery of the lid frame 5422 has approximately the same dimensions as the inner periphery of the supporting part 5421b of the base body frame 5421, and the thickness of the lid frame 5422 is such that the total of the thickness of the gasket 541 holding the separating membrane 30 and the thickness of the lid frame 5422 is approximately the same as the depth of the receiving part 5421a of the base body frame 5421, in the stacking direction. FIG. 12C is a cross-sectional view showing a position where the lid frame 5422 is received in the difference in levels between the face 5421c of the base body frame 5421 and the face 541a of the gasket. As shown in FIG. 12C, the gasket 541 and the lid frame 5422 are received in the receiving part 5421a of the base body frame 5421, which causes the gasket 541 to be held by the holding member 542. In the electrolysis vessel 500, since the protecting members 540 receive a pressing force in the stacking direction from the anode end cell 10e or the cathode end cell 20e adjacent thereto, or each of the chamber cells 10 and 20 (FIG. 11), the gasket 541 received in the receiving part 5421a of the base body frame 5421 is sandwiched between and held by the supporting part 5421b and the lid frame 5422 of the base body frame 5421 and fixed in the stacking direction.

In the electrolysis vessel 500, as the material forming the gasket 541, the same material as that described above concerning the gasket 40 can be used. As the resin material forming the base body frame 5421 and the lid frame 5422 of the holding member 542, an alkali-resistant resin material having strength enough to bear a pressing force applied in the stacking direction can be preferably used without particular limitations. Examples of such a resin material include rigid polyvinyl chloride resins, polypropylene resins, polyethylene resins, polyetherimide resins, polyphenylenesulfide resins, polybenzimidazole resins, polytetrafluoroethylene resins, tetrafluoroethylene-perfluoroalkyl vinyl ether copolymer resins, and tetrafluoroethylene-ethylene copolymer resins.

Such an electrolysis vessel 500 also makes it possible to obtain the same effect as that described above concerning the electrolysis vessel 100 (FIGS. 3 to 5).

<2. Method of Producing Gas>

The method of producing gas of the present invention is a method of producing at least hydrogen gas by electrolyzing alkaline water, the method comprising: (a) applying a fluctuating direct electric current to the electrolysis vessel for alkaline water electrolysis of the present invention, to recover hydrogen gas from the catholyte-and-gas recovery pipe (84). In the step (a), the amount of hydrogen gas generated per unit time by the main reaction when the electrolysis vessel is operated with the minimum electric current of the fluctuating direct electric current is preferably less than 10%, more preferably less than 5%, in one embodiment no less than 1%, and in another embodiment no less than 2% of the amount of hydrogen gas generated per unit time by the main reaction when the electrolysis vessel is operated with the maximum electric current of the fluctuating direct electric current, in view of being significantly benefited from the above described effect of the present invention. The step (a) may further comprise recovering oxygen gas from the anolyte-and-gas recovery pipe (83). The step (a) can further comprise supplying the anolyte from the anolyte supply pipe 71 and supplying the catholyte from the catholyte supply pipe 72, and recovering the anolyte from the anolyte-and-gas recovery pipe 73 and recovering the catholyte from the catholyte-and-gas recovery pipe 74. The fluctuating width of the fluctuating direct electric current is preferably within a predetermined range. According to the method of producing gas of the present invention, the electrolysis vessel for alkaline water electrolysis of the present invention is used, which makes it possible to suppress influence of a leakage current even when an unstable power supply is used. Thus, hydrogen gas and oxygen gas both having improved purity can be produced while an unstable power supply is used.

REFERENCE SIGNS LIST 10 anode chamber cell
10e, 210e anode end cell
20 cathode chamber cell
20e, 220e cathode end cell
310 integrated chamber cell
11, 21, 311 separating back wall
12, 22, 312 flange part
13, 23 electroconductive rib
14 anode (generating oxygen)
24 cathode (generating hydrogen)
30 (ion-permeable) separating membrane
40, 40A, 40C, 240A, 240C, 440, 440A, 440C, 540, 540A, 540C protecting member
441 metal plate
442 (insulating) elastomer coating
541 gasket
542 holding member
5421 base body frame
5421a receiving part
5421b supporting part
5422 lid frame
51, 251 anode-side insulating plate
52, 252 cathode-side insulating plate
61, 261 anode-side pressing frame
62, 262 cathode-side pressing frame
62a, 52a, 261a, 251a first through-hole
62b, 52b, 261b, 251b second through-hole
62c, 52c, 261c, 251c third through-hole
62d, 52d, 261d, 251c fourth through-hole
71 anolyte supply flow path
72 catholyte supply flow path
73 anolyte-and-gas recovery flow path
74 catholyte-and-gas recovery flow path
81 anolyte supply pipe
82 catholyte supply pipe
83 anolyte-and-gas recovery pipe
84 catholyte-and-gas recovery pipe
71a anolyte supply path
73a anolyte discharge path
72a catholyte supply path
74a catholyte discharge path
101e, 201e anode end unit 102e, 202e cathode end unit
100, 200, 300, 400, 500, 900 electrolysis vessel
A anode chamber
C cathode chamber

We claim:

1. An electrolysis vessel for alkaline water electrolysis, the electrolysis vessel comprising:
   an anode end unit;
   a cathode end unit;
   a plurality of anode chamber cell each comprising an anode arranged therein and a first electroconductive separating back wall, the anode generating oxygen;
   a plurality of cathode chamber cell each comprising a cathode arranged therein and a second electroconductive separating back wall, the cathode generating hydrogen; and
   a plurality of ion-permeable separating membrane each comprising a periphery, the periphery being held by a protecting member;
   the plurality of the anode chamber cell and the plurality of the cathode chamber cell being alternately arranged between the anode end unit and the cathode end unit;
   each adjacent pair of the plurality of separating membrane sandwiching a pair of the anode chamber cell and the cathode chamber cell, the anode chamber cell being arranged in a direction such that the first separating back wall is directed toward the anode end unit, the cathode chamber cell being arranged in a direction such that the second separating back wall is directed toward the cathode end unit, the cathode chamber cell and the anode chamber cell being arranged such that the first separating back wall and the second separating back wall adjoin each other, wherein the first separating back wall and the second separating back wall may be formed as one body;
   the anode end unit comprising, in the sequence set forth from an anode-end-side of the electrolysis vessel:
     an anode-side pressing frame;
     an anode-side insulating plate; and
     an anode end cell;
   the cathode end unit comprising, in the sequence set forth from a cathode-end-side of the electrolysis vessel:
     a cathode-side pressing frame;
     a cathode-side insulating plate; and
     a cathode end cell;
   the protecting members comprising a first protecting member adjacent to the anode end cell, and a second protecting member adjacent to the cathode end cell;
   the electrolysis vessel further comprising:
   an anolyte supply flow path arranged through a lower part of the anode end cell, each lower part of the anode chamber cells, each lower part of the cathode chamber cells, and each lower part of the protecting members other than the second protecting member, wherein an anolyte is supplied from the anolyte supply flow path into each anode chamber;
   an anolyte-and-gas recovery flow path arranged through an upper part of the anode end cell, each upper part of the anode chamber cells, each upper part of the cathode chamber cells, and each upper part of the protecting members other than the second protecting member, wherein the anolyte and a gas generated at the anode are recovered from each anode chamber into the anolyte-and-gas recovery flow path;
   a catholyte supply flow path arranged through a lower part of the cathode end cell, each lower part of the anode chamber cells, each lower part of the cathode chamber cells, and each lower part of the protecting members other than the first protecting member, wherein a catholyte is supplied from the catholyte supply flow path into each cathode chamber;
   a catholyte-and-gas recovery flow path arranged through an upper part of the cathode end cell, each upper part of the anode chamber cells, each upper part of the cathode chamber cells, and each upper part of the protecting members other than the first protecting member, wherein the catholyte and a gas generated at the cathode are recovered from each cathode chamber into the catholyte-and-gas recovery flow path;
   a first through-hole being arranged through the anode-side pressing frame and the anode-side insulating plate such that the first through-hole communicates with the anolyte supply flow path, or being arranged through the cathode-side pressing frame and the cathode-side insulating plate such that the first through-hole communicates with the anolyte supply flow path;
   an anolyte supply pipe being connected with the anolyte supply flow path via the first through-hole and supplying the anolyte to the anolyte supply flow path;
   a second through-hole being arranged through the anode-side pressing frame and the anode-side insulating plate such that the second through-hole communicates with the catholyte supply flow path, or being arranged through the cathode-side pressing frame and the cathode-side insulating plate such that the second through-hole communicates with the catholyte supply flow path;
   a catholyte supply pipe being connected with the catholyte supply flow path via the second through-hole and supplying the catholyte to the catholyte supply flow path;
   a third through-hole being arranged through the anode-side pressing frame and the anode-side insulating plate such that the third through-hole communicates with the anolyte-and-gas recovery flow path, or being arranged through the cathode-side pressing frame and the cathode-side insulating plate such that the third through-hole communicates with the anolyte-and-gas recovery flow path;
   an anolyte-and-gas recovery pipe being connected with the anolyte-and-gas recovery flow path via the third through-hole and recovering the anolyte and the gas from the anolyte-and-gas recovery flow path;
   a fourth through-hole being arranged through the anode-side pressing frame and the anode-side insulating plate such that the fourth through-hole communicates with the catholyte-and-gas recovery flow path, or being arranged through the cathode-side pressing frame and the cathode-side insulating plate such that the fourth through-hole communicates with the catholyte-and-gas recovery flow path;
   a catholyte-and-gas recovery pipe being connected with the catholyte-and-gas recovery flow path via the fourth through-hole and recovering the catholyte and the gas from the catholyte-and-gas recovery flow path; and
   the anolyte supply pipe, the catholyte supply pipe, the anolyte-and-gas recovery pipe, and the catholyte-and-gas recovery pipe each being a metal pipe comprising an inner surface, at least the inner surface of the metal pipe being coated with an insulating resin,
   wherein if the anolyte supply pipe is connected with the anolyte supply flow path via the first through-hole arranged through the cathode-side pressing frame and the cathode-side insulating plate, the anolyte supply flow path is also arranged through the lower part of the cathode end cell and a lower part of the second protecting member as well;

if the catholyte supply pipe is connected with the catholyte supply flow path via the second through-hole arranged through the anode-side pressing frame and the anode-side insulating plate, the catholyte supply flow path is also arranged through the lower part of the anode end cell and a lower part of the first protecting member as well;

if the anolyte-and-gas recovery pipe is connected with the anolyte-and-gas recovery flow path via the third through-hole arranged through the cathode-side pressing frame and the cathode-side insulating plate, the anolyte-and-gas recovery flow path is also arranged through the upper part of the cathode end cell and an upper part of the second protecting member as well;

if the catholyte-and-gas recovery pipe is connected with the catholyte-and-gas recovery flow path via the fourth through-hole arranged through the anode-side pressing frame and the anode-side insulating plate, the catholyte-and-gas recovery flow path is also arranged through the upper part of the anode end cell and an upper part of the first protecting member as well;

at a junction of the anolyte supply pipe and the anolyte supply flow path and at a junction of the anolyte-and-gas recovery pipe and the anolyte-and-gas recovery flow path, the anolyte does not contact with any metal member of the anolyte supply pipe, any metal member of the anolyte-and-gas recovery pipe, any metal member of the anode-side pressing frame, any metal member of the cathode-side pressing frame, or any metal member electrically connected therewith;

at a junction of the catholyte supply pipe and the catholyte supply flow path and at a junction of the catholyte-and-gas recovery pipe and the catholyte-and-gas recovery flow path, the catholyte does not contact with any metal member of the catholyte supply pipe, any metal member of the catholyte-and-gas recovery pipe, any metal member of the anode-side pressing frame, any metal member of the cathode-side pressing frame, or any metal member electrically connected therewith; and an amount of hydrogen gas generated per unit time by a main reaction when the electrolysis vessel is operated with a minimum electric current is less than 10% of an amount of hydrogen gas generated per unit time by the main reaction when the electrolysis vessel is operated with a maximum electric current.

2. The electrolysis vessel according to claim 1, wherein respective parts of the anolyte supply flow path communicate with each other;

respective parts of the anolyte-and-gas recovery flow path communicate with each other;

respective parts of the catholyte supply flow path communicate with each other; and respective parts of the catholyte-and-gas recovery flow path communicate with each other.

3. The electrolysis vessel according to claim 1, wherein the catholyte supply flow path is arranged through the lower part of the anode end cell, each lower part of the anode chamber cells, each lower part of the cathode chamber cells, each lower part of the protecting members, and the lower part of the cathode end cell;

the catholyte-and-gas recovery flow path is arranged through the upper part of the anode end cell, each upper part of the anode chamber cells, each upper part of the cathode chamber cells, each upper part of the protecting members, and the upper part of the cathode end cell;

the anolyte supply pipe is connected with the anolyte supply flow path via the first through-hole, wherein the first through-hole is arranged through the anode-side pressing frame and the anode-side insulating plate such that the first through-hole communicates with the anolyte supply flow path;

the catholyte supply pipe is connected with the catholyte supply flow path via the second through-hole, wherein the second through-hole is arranged through the anode-side pressing frame and the anode-side insulating plate such that the second through-hole communicates with the catholyte supply flow path;

the anolyte-and-gas recovery pipe is connected with the anolyte-and-gas recovery flow path via the third through-hole, wherein the third through-hole is arranged through the anode-side pressing frame and the anode-side insulating plate such that the third through-hole communicates with the anolyte-and-gas recovery flow path; and the catholyte-and-gas recovery pipe is connected with the catholyte-and-gas recovery flow path via the fourth through-hole, wherein the fourth through-hole is arranged through the anode-side pressing frame and the anode-side insulating plate such that the fourth through-hole communicates with the catholyte-and-gas recovery flow path.

4. The electrolysis vessel according to claim 1, wherein the anolyte supply flow path is arranged through the lower part of the anode end cell, each lower part of the anode chamber cells, each lower part of the cathode chamber cells, each lower part of the protecting members, and the lower part of the cathode end cell;

the anolyte-and-gas recovery flow path is arranged through the upper part of the anode end cell, each upper part of the anode chamber cells, each lower part of the cathode chamber cells, each upper part of the protecting members, and the upper part of the cathode end cell;

the anolyte supply pipe is connected with the anolyte supply flow path via the first through-hole, wherein the first through-hole is arranged through the cathode-side pressing frame and the cathode-side insulating plate such that the first through-hole communicates with the anolyte supply flow path;

the catholyte supply pipe is connected with the catholyte supply flow path via the second through-hole, wherein the second through-hole is arranged through the cathode-side pressing frame and the cathode-side insulating plate such that the second through-hole communicates with the catholyte supply flow path;

the anolyte-and-gas recovery pipe is connected with the anolyte-and-gas recovery flow path via the third through-hole, wherein the third through-hole is arranged through the cathode-side pressing frame and the cathode-side insulating plate such that the third through-hole communicates with the anolyte-and-gas recovery flow path; and the catholyte-and-gas recovery pipe is connected with the catholyte-and-gas recovery flow path via the fourth through-hole, wherein the fourth through-hole is arranged through the cathode-side pressing frame and the cathode-side insulating plate such that the fourth through-hole communicates with the catholyte-and-gas recovery flow path.

5. A method of producing at least hydrogen gas by electrolyzing alkaline water, the method comprising:

(a) applying a fluctuating direct electric current to the electrolysis vessel as defined in claim 1, to recover hydrogen gas from the catholyte-and-gas recovery pipe, wherein in the (a), an amount of hydrogen gas generated per unit time by a main reaction when the electrolysis vessel is operated with a minimum electric current of the fluctuating direct electric current is less than 10% of an amount of hydrogen gas generated per unit time by the main reaction when the electrolysis vessel is operated with a maximum electric current of the fluctuating direct electric current.

6. The method according to claim 5, the (a) further comprising:

recovering oxygen gas from the anolyte-and-gas recovery pipe.

\* \* \* \* \*